(12) United States Patent
Noda et al.

(10) Patent No.: US 7,321,707 B2
(45) Date of Patent: Jan. 22, 2008

(54) ELECTROMAGNETIC WAVE FREQUENCY FILTER

(75) Inventors: Susumu Noda, Uji (JP); Takashi Asano, Kyoto (JP); Bong-Shik Song, Kyoto (JP); Hitomichi Takano, Hirakata (JP)

(73) Assignees: Japan Science and Technology Agency, Kawaguchi-shi (JP); Matsushita Electric Works, Ltd., Osaka (JP)

( * ) Notice: Subject to any disclaimer, the term of this patent is extended or adjusted under 35 U.S.C. 154(b) by 27 days.

(21) Appl. No.: 10/569,922

(22) PCT Filed: Aug. 26, 2004

(86) PCT No.: PCT/JP2004/012287

§ 371 (c)(1),
(2), (4) Date: Feb. 28, 2006

(87) PCT Pub. No.: WO2005/022221

PCT Pub. Date: Mar. 10, 2005

(65) Prior Publication Data

US 2006/0269188 A1 Nov. 30, 2006

(30) Foreign Application Priority Data

Aug. 29, 2003 (JP) ............................. 2003-307266

(51) Int. Cl.
*G02B 6/26* (2006.01)
(52) U.S. Cl. ........................... 385/50; 385/14; 385/129
(58) Field of Classification Search .................. 385/14
See application file for complete search history.

(56) References Cited

U.S. PATENT DOCUMENTS

2002/0000328 A1 1/2002 Motomura et al.

(Continued)

FOREIGN PATENT DOCUMENTS

EP 0397177 11/1990

(Continued)

OTHER PUBLICATIONS

S. Fan, et al.; "Channel Drop Tunneling through Localized States;" *Physical Review Letters*; vol. 80; No. 5; Feb. 2, 1998; pp. 960-963.

(Continued)

*Primary Examiner*—Sung Pak
(74) *Attorney, Agent, or Firm*—Edwards Angell Palmer & Dodge LLP

(57) ABSTRACT

In this electromagnetic wave frequency filter, an electromagnetic wave of a predetermined frequency matching a resonant frequency of a resonator $4_1$ is transmitted from an input waveguide 2 to an output waveguide 3 through the resonator $4_1$, and is outputted from a drop port $P3_1$. This filter has an input-waveguide-side reflector $21_1$ and an output-waveguide-side reflector $31_1$, which reflect the electromagnetic wave of the predetermined frequency. The electromagnetic wave frequency filter satisfies the following relation:

$$Q_{inb}/(1-\cos\theta_1) << Q_v,$$

$$Q_{inb}/(1-\cos\theta_1) = Q_{inr}/(1-\cos\theta_2),$$

$$\theta_1, \theta_2 \neq 2N\pi (N=0, 1, \ldots),$$

where $\theta_1$ is a phase shift amount of the electromagnetic wave reflected by the input-waveguide-side reflector $21_1$, $\theta_2$ is a phase shift amount of the electromagnetic wave reflected by the output-waveguide-side reflector $31_1$, $Q_{inb}$ is a Q-factor between the resonator $4_1$ and the input waveguide 2, $Q_{inr}$ is a Q-factor between the resonator $4_1$ and the output waveguide $3_1$, and $Q_v$ is a Q-factor between the resonator $4_1$ and free space.

16 Claims, 13 Drawing Sheets

U.S. PATENT DOCUMENTS

| | | |
|---|---|---|
| 2002/0023777 A1 | 2/2002 | Ochi et al. |
| 2002/0041425 A1 | 4/2002 | Baba et al. |
| 2005/0147371 A1 | 7/2005 | Noda et al. |
| 2005/0175358 A1* | 8/2005 | Ilchenko et al. ............ 398/198 |
| 2007/0009205 A1* | 1/2007 | Maleki et al. ................ 385/27 |

FOREIGN PATENT DOCUMENTS

| | | |
|---|---|---|
| JP | 06-283866 | 10/1994 |
| JP | 2001-508887 | 7/2001 |
| JP | 2002-71981 | 3/2002 |
| JP | 2003-139977 | 5/2003 |
| JP | 2003-279765 | 10/2003 |
| JP | 2004-212416 | 7/2004 |
| JP | 2004-233941 | 8/2004 |
| JP | 2004-245866 | 9/2004 |
| WO | 98/57207 A1 | 12/1998 |
| WO | 01/20379 A1 | 3/2001 |

OTHER PUBLICATIONS

C. Manolatou, et al.; "Coupling of Modes Analysis of Resonant Channel Add-Drop Filters;" *IEEE Journal of Quantum Electronics*; vol. 35; No. 9; Sep. 1999; pp. 1322-1331.

B.-S. Song, et al.; "Photonic Devices Based on In-Plane Hetero Photonic Crystals;" *Science*; vol. 300; Jun. 6, 2003; p. 1537.

S. Hoshoku, et al.; "Optical Add/Drop Filter Using an In-plane Hetero Photonic Crystal;" *Extended Abstracts of the 63$^{rd}$ Autumn Meeting of Japan Society of Applied Physics*; Separate vol. 3; 2002; pp. 916, 25p-YA-17 with English abstract (3 Sheets total.).

S. Asano, et al.; Optical Add/Drop Filter Using 2D Photonic Crystal Slab—Interference between single defects; *Extended Abstracts of the 49$^{th}$ Spring Meeting of Japan Society of Applied Physics*; Separate vol. 3; 2002; pp. 1039, 29p-L-7 with English abstract (3 Sheets total.).

Y. Sugimoto, et al.; "Design and characterization of coupling-controlled directional coupler (CC-DC) based on photonic-crystal;" *Extended Abstracts of the 50$^{th}$ Spring Meeting of Japan Society of Applied Physics*; Separate vol. 3; 2003; pp. 1137, 29a-YN-5 with English abstract (3 pages total.).

Y. Sugimoto, et al.; "Design, Fabrication, and characterization of coupling-strength-controlled directional coupler based on two-dimensional photonic-crystal slab waveguides;" *Applied Physics Letters*; vol. 83; No. 16; Oct. 20, 2003; pp. 3236-3238 (2 Sheets total.).

* cited by examiner

DROP EFFICIENCY

ELECTROMAGNETIC WAVE FREQUENCY FILTER

TECHNICAL FIELD

The present invention relates to an electromagnetic wave frequency filter for selectively extracting an electromagnetic wave of a predetermined frequency.

BACKGROUND ART

Recently, in order to increase a capacity of transmission, an optical communications system using wavelength-division multiplexing becomes popular in an optical communications field and so on. In the optical communications system using wavelength-division multiplexing, a multiplexer, a demultiplexer, and a wavelength filter (frequency filter) are required. Generally, as a demultiplexer, an arrayed waveguide grating (AWG) is used. However, because the arrayed waveguide grating is formed by using a silica-based optical waveguide and therefore is roughly a few centimeters square, a smaller demultiplexer is expected. So, in order to miniaturize a demultiplexer, a frequency filter using a photonic crystal having a refractive-index periodic structure of the order of wavelength of light (in most cases, it is around a half wavelength of an estimated electromagnetic wave band.) has been developed in many places.

For example, as a frequency filter of this kind, an electromagnetic wave frequency filter shown in FIGS. 14A and 14B is proposed. The electromagnetic wave frequency filter has an input waveguide 2 which is linear, an output waveguide 3 disposed in a spaced relation to the input waveguide 2 in a width direction of the input waveguide 2, and a resonator 4 disposed between an intermediate part of the input waveguide 2 and an intermediate part of the output waveguide 3, in a so-called slab type photonic crystal 1. In the electromagnetic wave frequency filter shown in FIGS. 14A and 14B, the input waveguide 2 and the output waveguide 3 are formed by creating two linear defects (namely, disturbances of the refractive-index periodic structure) in the refractive-index periodic structure of the two-dimensional photonic crystal 1, and the resonator 4 is formed by creating a point-like defect in the refractive-index periodic structure of the two-dimensional photonic crystal 1. In the slab type two-dimensional photonic crystal 1, both sides in the thickness direction of a slab 11 made of high-refractive-index medium, such as Si, are sandwiched by uniform low-refractive-index mediums, such as air and $SiO_2$, and therefore electromagnetic waves (for example, light) are confined by a photonic bandgap in a plane and the electromagnetic waves are confined by total reflection in the thickness direction.

In the above-mentioned electromagnetic wave frequency filter, one end of the input waveguide 2 is defined as port P1 (input port P1), the other end of the input waveguide 2 is defined as port P2, and one end of the output waveguide 3 is defined as port P3 (drop port P3), the other end is defined as port P4. When a plurality of electromagnetic waves of different frequencies are made incident to the input port P1, electromagnetic waves of a predetermined frequency matching a resonant frequency of the resonator 4, out of the plurality of electromagnetic waves, is transmitted to the output waveguide 3 through the resonator 4, and then outputted from the drop port P3. Electromagnetic waves having frequencies different from the resonant frequency of the resonator 4 are propagated toward the port 2 of the input waveguide 2. In FIG. 14A, solid arrows show traveling pathways of the electromagnetic wave having the frequency matching the resonant frequency of the resonator 4, and an arrow of an alternate long and short dash line shows a propagation path of the electromagnetic waves of the frequencies different from the resonant frequency of the resonator 4.

The above mentioned electromagnetic wave frequency filter may be used as an optical switch which varies the output of the drop port P3 and switches an extraction of the electromagnetic waves from the drop port P3.

By the way, the inventors evaluated output strength of each port P1 to P4 and output strength from the resonator 4 to free space in the conventional electromagnetic wave frequency filter shown in FIGS. 14A, 14B, by using mode-coupling theory, and they got a result shown in FIG. 15. When the mode-coupling theory was applied, a Q-factor between the resonator 4 and the input waveguide 2 was defined as $Q_{in}$ and a Q-factor between the resonator 4 and the free space was defined as $Q_v$. In FIG. 15, a horizontal axis indicates $Q_{in}/Q_v$ and a vertical axis indicates the output strength, and "X1" in FIG. 15 indicates the output strength of the port P2, "X2" indicates the output strength of the ports P1, P3, and P4, and "X3" indicates the output strength to the free space. As shown in FIG. 15, in the conventional electromagnetic wave frequency filter, the maximum value of the drop efficiency to the drop port P3 (that is, wavelength selection efficiency) is only 25% in theory, so there is a problem that the drop efficiency is too inefficient. In addition, $Q_{in}$ is a value related to an amount of energy which leaks from the resonator 4 to the input waveguide 2 in a resonator-input waveguide system. In other words, $Q_{in}$ is a value showing how much energy the resonator 4 can store, in the resonator-input waveguide system. $Q_{in}$ is defined as the following expression:

$$Q_{in}=\omega_o \times W/(-dW/dt)$$

where $\omega_o$ represents the resonant frequency of the resonator 4, W represents the energy stored in the resonator 4, and (−dW/dt) represents the energy which is lost from the resonator 4 to the input waveguide 2 per unit time. The $Q_v$ is a value related to an amount of energy which leaks from the resonator 4 to the free space, in a resonator-free space system. In other words, the $Q_v$ is a value showing how much energy the resonator 4 can store, in the resonator-free space system. The $Q_v$ is defined as the following expression:

$$Q_v=\omega_o \times W/(-dW/dt)$$

where $\omega_o$ represents the resonant frequency of the resonator 4, W represents the energy stored in the resonator 4, and (−dW/dt) represents the energy which is lost from the resonator 4 to the free space per unit time.

Furthermore, an electromagnetic wave frequency filter which can achieve high drop efficiency compared with the electromagnetic wave frequency filter shown in FIGS. 14A and 14B has been proposed. The electromagnetic wave frequency filter comprises a two-dimensional photonic crystal in which cylindrical rods made of mediums having high refractive index than air are disposed in a two-dimensional plane, and an input waveguide, an output waveguide and two resonators are formed in the two-dimensional photonic crystal (for example, see Japanese Kohyo (National Publication of Translated Version) No. 2001-50887, p. 22-23, p. 40-46, FIGS. 3, 8, and 22, and C. Manolatou, et al, "Coupling of Modes Analysis of Resonant Channel Add-Drop Filters", IEEE JOURNAL OF QUANTUM ELECTRONICS, VOL. 35, No. 9, 1999, p. 1322-1331, and Shanhui Fan, et al, "Channel Drop Tunneling through Localized States", PHYSICAL REVIEW LETTERS, VOL. 80, No. 5, 1998, p. 960-963).

In the electromagnetic wave frequency filter of this kind, the electromagnetic waves propagated toward the opposite end of the input port of the input waveguide and the electromagnetic wave propagated toward the opposite end of the drop port of the output waveguide can be cancelled out by a resonance mode of the two resonators. Concretely speaking, the two resonators construct a symmetric mode in which both resonators oscillate in phase and an antisymmetric mode in which the two resonators oscillate in opposite phase, and when the resonant frequency in the symmetric mode and the resonant frequency in the antisymmetric mode agree with each other, and damping rates in the symmetric mode with respect to the input waveguide, the output waveguide, and the free space outside the plane each are equal to damping rates in the antisymmetric mode with respect to them, respectively, and phase difference between an oscillation in the symmetric mode and an oscillation in the antisymmetric mode satisfies a specific condition (for example, π), the electromagnetic waves propagated in the opposite direction of the input port (inlet end) of the input waveguide from the resonator and the electromagnetic waves propagated in the opposite direction of the drop port (output end) of the output waveguide from the resonator can be canceled out. Therefore, the electromagnetic waves can be selectively dropped out from only a specific drop port.

By the way, in the above conventional electromagnetic wave frequency filter having two resonators, the resonant frequency in the symmetric mode $\omega_s$ and the resonant frequency in the antisymmetric mode $\omega_a$ each can be calculated by the following equations:

$$\omega_s = \omega_o - \{\mu - (1/\tau e) \times \sin \phi - (1/\tau e') \times \sin \phi'\}$$

$$\omega_a = \omega_o + \{\mu - (1/\tau e) \times \sin \phi - (1/\tau e') \times \sin \phi'\}$$

where $\mu$ is a binding energy between the resonators not through any waveguide, $\phi$ is a phase shift amount of between the resonators themselves at the time the resonators couples with each other through the input waveguide, $\phi'$ is a phase shift amount at the time the resonators couples with each other through the output waveguide, $(1/\tau e)$ is a damping rate of energy from the resonators to the input waveguide, $(1/\tau e')$ is a damping rate of energy from the resonators to the output waveguide, and $\omega_o$ is a resonant frequency in a case where each resonator exists independently. As is clear from the above equations, the resonant frequencies $\omega_s$, $\omega_a$ of these modes are different from each other essentially, and therefore, in order to conform these resonant frequencies $\omega_s$, $\omega_a$ of both modes to each other, it is necessary to satisfy the following condition:

$$\mu - (1/\tau e) \times \sin \phi - (1/\tau e') \times \sin \phi' = 0$$

However, in order to satisfy the above condition, it is necessary to adopt a complex structure. For example, it is necessary to set the refractive index of the rods near the resonator to a value different from the refractive index of the rest rods, or to set the radius of the rods near the resonator to a very small value compared to the radius of the rest rods. Therefore, there were many design constrains, and it was difficult to design and manufacture the electromagnetic wave frequency filter.

DISCLOSURE OF THE INVENTION

In view of the above problem, the object of the present invention is to provide an electromagnetic wave frequency filter which can effectively extract an electromagnetic wave of a predetermined frequency out of electromagnetic waves of a plurality of frequencies inputted into an input waveguide from a drop port of an output waveguide, and can be formed by a comparatively easy design.

The electromagnetic wave frequency filter in accordance with the present invention comprises an input waveguide configured to receive electromagnetic waves of a plurality of frequencies inputted into a one end of the input waveguide, an output waveguide disposed alongside said input waveguide, and a resonator disposed between the input waveguide and the output waveguide. The resonator has a predetermined resonant frequency and resonates with an electromagnetic wave of a predetermined frequency matching the resonant frequency so as to transmit the electromagnetic wave from the input waveguide to the output waveguide, thereby allows the electromagnetic wave to be emitted from a drop port of a one end of the output waveguide. The features of the present invention resides in that the input waveguide has an input-waveguide-side reflector for reflecting the electromagnetic wave of the resonant frequency on the opposite side of the one end of the input waveguide from the resonator, and the output waveguide has an output-waveguide-side reflector for reflecting the electromagnetic wave of the predetermined frequency on the opposite side of the one end of the output waveguide, and the electromagnetic wave frequency filter satisfies the following relation:

$$Q_{inb}/(1-\cos \theta_1) << Q_v$$

$$Q_{inb}/(1-\cos \theta_1) = Q_{inr}/(1-\cos \theta_2)$$

$$\theta_1, \theta_2 \neq 2N\pi (N=0, 1, \ldots),$$

where $\theta_1$ is a phase shift amount of the electromagnetic wave reflected by the input-waveguide-side reflector and returned to near the resonator, $\theta_2$ is a phase shift amount of the electromagnetic wave reflected by the output-waveguide-side reflector and returned to near the resonator, $Q_{inb}$ is a Q-factor between the resonator and the input waveguide, $Q_{inr}$ is a Q-factor between the resonator and the output waveguide, and $Q_v$ is a Q-factor between the resonator and free space. $Q_{inb}$ is a value related to an amount of energy which leaks from the resonator to the input waveguide in a resonator-input waveguide system. In other words, $Q_{inb}$ is a value indicating how much energy the resonator can store in the resonator-input waveguide system. $Q_{inb}$ is defined as the expression:

$$Q_{inb} = \omega_o \times W/(-dW/dt)$$

where $\omega_o$ is the resonant frequency of the resonator, W is the energy stored in the resonator, and $(-dW/dt)$ is the energy which is lost from the resonator to the input waveguide side per unit time. $Q_{inr}$ is a value related to an amount of energy which leaks from the resonator to the output waveguide in a resonator-output waveguide system. In other words, $Q_{inr}$ is a value indicating how much energy the resonator 4 can store in the resonator-output waveguide system. $Q_{inr}$ is defined as the expression:

$$Q_{inr} = \omega_o \times W/(-dW/dt)$$

where $\omega_o$ is the resonant frequency of the resonator, W is the energy stored in the resonator, and $(-dW/dt)$ is the energy which is lost from the resonator to the output waveguide per unit time. $Q_v$ is a value related to an amount of energy which leaks from the resonator to the free space in a resonator-free space system. In other words, the $Q_v$ is a value showing how much energy the resonator can store in the resonator-free space system. $Q_v$ is defined as the expression:

$$Q_v = \omega_o \times W/(-dW/dt)$$

where $\omega_o$ is the resonant frequency of the resonator, W is the energy stored in the resonator, and $(-dW/dt)$ is the energy which is lost from the resonator to the free space per unit time. However, $Q_{inb}$, $Q_{inr}$, and $Q_v$ each are a value to be decided by an entire system including the input waveguide and the output waveguide. If there is a parasitic reflection component at the one end of the input waveguide or at the one end of the output waveguide, or if there is a parasitic resonator component, such as a bent waveguide, in the input or output waveguide, $Q_{inb}$, $Q_{inr}$, and $Q_v$ each are decided in view of these parasitic components.

The electromagnetic wave frequency filter of the present invention can effectively extract the electromagnetic wave of a predetermined frequency matching the resonant frequency of the resonator out of the electromagnetic waves of a plurality of frequencies made incident to the input waveguide, from the drop port of the output waveguide, and can be formed by a comparatively easy design. It becomes possible for the electromagnetic wave frequency filter to achieve nearly 100% drop efficiency.

Preferably, the electromagnetic wave frequency filter has an in-plane heterostructure in which at least a first photonic crystal having a refractive-index periodic structure in a two-dimensional plane and a second photonic crystal having a refractive-index periodic structure whose period is different from that of the refractive-index periodic structure of the first photonic crystal are placed side by side in the same plane, and the input waveguide is formed by creating a linear defect in the refractive-index periodic structures of the first and second photonic crystals along the entire length thereof in an arranging direction of these photonic crystals, and the output waveguide is formed by creating a linear defect in the refractive-index periodic structures of the first and second photonic crystals astride these photonic crystals in the arranging direction of these photonic crystals, and the resonator is formed by creating a pot-like defect in the first photonic crystal, and the resonant frequency of the resonator is included in a frequency band having no waveguide mode in the second photonic crystal, and the input-waveguide-side reflector is formed by a boundary between a portion of the input waveguide formed in the first photonic crystal and a portion of the input waveguide formed in the second photonic crystal, and the output-waveguide-side reflector is formed by a boundary between a portion of the output waveguide formed in the first photonic crystal and a portion of the output waveguide formed in the second photonic crystal.

In this case, the electromagnetic wave of the resonant frequency can be reflected by using the in-plane heterostructure.

More preferably, the first photonic crystal and the second photonic crystal each are a two-dimensional photonic crystal, and a clearance between the resonator and the input waveguide and a clearance between the resonator and the output waveguide are set equal to each other, a distance $d_1$ between the resonator and the input-waveguide-side reflector in a direction along the input waveguide and a distance $d_2$ between the resonator and the output-waveguide-side reflector in a direction along the output waveguide are set equal to each other ($d_1 = d_2$), and a propagation constant of the input waveguide $\beta_1$ and a propagation constant of the output waveguide $\beta_2$ are set equal to each other ($\beta_1 = \beta_2$), an amount of axis misalignment between the portion of the input waveguide formed in the first two-dimensional photonic crystal and the portion of the input waveguide formed in the second two-dimensional photonic crystal and an amount of axis misalignment between the portion of the output waveguide formed in the first two-dimensional photonic crystal and the portion of the output waveguide formed in the second two-dimensional photonic crystal are set equal to each other so as to make a reflection phase shift $\Delta_1$ of the electromagnetic wave reflected by the input-waveguide-side reflector and a reflection phase shift $\Delta_2$ of the electromagnetic wave reflected by the output-waveguide-side reflector equal to each other ($\Delta_1 = \Delta_2$).

In this case, $\theta_1$ becomes equal to $\theta_2$ ($\theta_1 = \theta_2$), so a fluctuation range of the drop efficiency with respect to fluctuations of $\theta_1$ and $\theta_2$ is low, and therefore a margin for the fluctuations of $\theta_1$ and $\theta_2$ can be increased.

More preferably, in the vicinity of the boundary between the first photonic crystal and the second photonic crystal, the period of the refractive-index periodic structure of at least one of the first two-dimensional photonic crystal and the second two-dimensional photonic crystal is changed in stages so that the input waveguide extends smoothly and continuously near the boundary.

In this case, because the input waveguide extends smoothly and continuously in the vicinity of the boundary between the first photonic crystal and the second photonic crystal, reflection loss, resulting from the axis misalignment of the input waveguide, of the electromagnetic waves of frequencies different from the resonant frequency of the resonator formed in the first photonic crystal can be reduced.

It is also preferable that relative positions of the first photonic crystal and the second photonic crystal in an arranging direction of the input waveguide and the output waveguide are set so that the axis misalignment of the input waveguide is not generated between the first photonic crystal and the second photonic crystal, and the distance between the input-waveguide-side reflector and the resonator are set so that a relation $\cos \theta_1 = \cos \theta_2$ is satisfied.

In this case, the reflection losses, resulting from the axis misalignment of the input waveguide, of the electromagnetic waves of frequencies different from the resonant frequency can be eliminated.

Or, it is also preferable that the relative positions of the first photonic crystal and the second photonic crystal in the arranging direction of the input waveguide and the output waveguide are set so that the axis misalignment of the input waveguide is not generated between the first photonic crystal and the second photonic crystal, and a phase compensator for matching $\Delta_2$ to $\Delta_1$ is provided at the output-waveguide-side reflector.

In this case, it is possible to match a reflection efficiency of the output-waveguide-side reflector to that of the input-waveguide-side reflector, whereby a margin for the change of the distances $d_1$ and $d_2$ can be increased.

It is also preferable that the electromagnetic wave frequency filter has an in-plane heterostructure in which at least a first photonic crystal having a refractive-index periodic structure in a two-dimensional plane and a second photonic crystal having a refractive-index periodic structure whose period is different from that of the refractive-index periodic structure of the first photonic crystal are placed side by side in the same plane, and the input waveguide is formed by creating a linear defect in the refractive-index periodic structures of the first and the second photonic crystals along the entire length thereof in the arranging direction of these photonic crystals, and the resonator is formed by creating a pot-like defect in the first photonic crystal, and the output waveguide is formed by creating a linear defect in the refractive-index periodic structure of the first photonic crystal, and an opposite end of the output waveguide constitutes the output-waveguide-side reflector.

In this case, in the input waveguide, the electromagnetic waves of the resonant frequency can be reflected by using the in-plane heterostructure, and in the output waveguide, the electromagnetic waves of the resonant frequency can be reflected by using a photonic bandgap of the first two-dimensional photonic crystal at the opposite end of the output waveguide.

In the above case, it is preferable that the first photonic crystal and the second photonic crystal each are a two-dimensional photonic crystal, and the distance $d_1$ between said resonator and said input-waveguide-side reflector in a direction along said input waveguide and the distance $d_2$ between said resonator and said output-waveguide-side reflector in a direction along said output waveguide are set so that a relation $\cos \theta_1 = \cos \theta_2$ is satisfied.

In this case, it becomes easy to design the electromagnetic wave frequency filter.

More preferably, the refractive-index periodic structure of the first photonic crystal is varied so that electromagnetic field distribution near the opposite end of the output waveguide does not change abruptly.

In this case, an abrupt change of the electromagnetic field distribution near the opposite end of the output waveguide can be prevented, so that radiation loss to the free space can be lowered, and therefore the drop efficiency can be improved.

Preferably, the electromagnetic wave frequency filter is designed so that $Q_{inb}$, $Q_{inr}$, $\cos \theta_1$, and $\cos \theta_2$ satisfy the following relations: $Q_{inb} = Q_{inr}$ and $\cos \theta_1 = \cos \theta_2$.

In this case, it is possible to increase the drop efficiency in a symmetric structure with respect to the resonator where the distance between the resonator and the input waveguide and the distance between the resonator and the output waveguide are set equal to each other, therefore it becomes easy to design the filter.

It is also preferable that the electromagnetic wave frequency filter further comprises a control means for changing the output of the drop port by varying the refractive index near at least one of the input-waveguide-side reflector and the output-waveguide-side reflector, or a control means for changing the output of the drop port by varying the period of the refractive-index periodic structure near at least one of the input-waveguide-side reflector and the output-waveguide-side reflector, or a control means for changing the output of the drop port by changing the refractive index near the input and output waveguide reflectors, and the resonator each.

In these cases, the electromagnetic wave frequency filter can be used as a frequency selective (wavelength selective) electromagnetic wave switch.

It is also preferably that $Q_{inb} \neq Q_{inr}$, and the electromagnetic wave frequency filter further comprises a control means for changing the output of the drop port by varying the refractive index near the output-waveguide-side reflector.

In this case, the electromagnetic wave frequency filter can be used as a frequency selective (wavelength selective) electromagnetic wave switch, and furthermore, it is possible to reduce an amount of energy consumption and make the switching speed faster, because an amount of change of the drop efficiency in response to a change of the amount of $\theta_2$ is increased.

BEST MODE FOR CARRYING OUT THE INVENTION

Hereinafter, the present invention will be described in more detail with reference to the accompanying drawings.

First Embodiment

Figure 1:
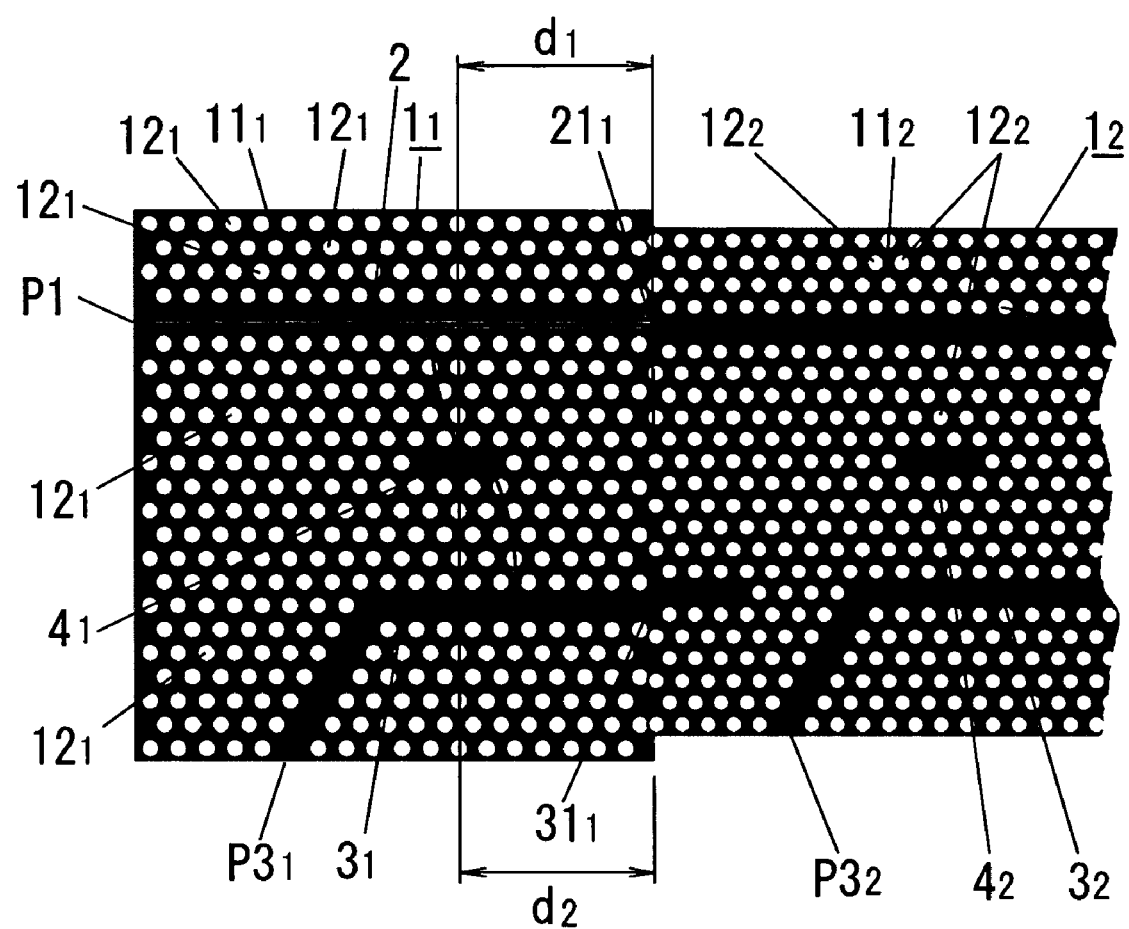
FIG. 1 is a schematic plan view showing a first embodiment of the present invention.

As shown in FIG. 1, an electromagnetic wave frequency filter of this embodiment has an in-plane heterostructure in which a plurality of two-dimensional photonic crystals $1_1$, $1_2$, . . . each having a refractive-index periodic structure whose period is different from the others are placed side by side in one direction (horizontal direction of FIG. 1) in a two-dimensional plane (in FIG. 1, only two two-dimensional photonic crystals $1_1$, $1_2$ are shown). The electromagnetic wave frequency filter has an input waveguide 2, which are formed by creating a linear defect in the refractive-index periodic structures of all the two-dimensional photonic crystals $1_1$, $1_2$, . . . along the entire length of the two-dimensional photonic crystals in an arranging direction of the two-dimensional photonic crystals $1_1$, $1_2$, . . . . The electromagnetic wave frequency filter also has output waveguides $3_1$, $3_2$, . . . , each of which is formed by creating a linear defect in the refractive-index periodic structures of each pair of two-dimensional photonic crystals $1_n$, $1_m$ (n=1, 2, . . . , m=n+1) adjacent to each other in the arranging direction of these two-dimensional photonic crystals $1_1$, $1_2$, ... so that the linear defect is astride each pair of two-dimensional photonic crystals $1_n$, $1_m$. The electromagnetic wave frequency filter also has resonators $4_1$, $4_2$, ..., each of which is formed by creating pot-like defects in the refractive-index periodic structure of one two-dimensional photonic crystal $1_n$ of each pair of two-dimensional photonic crystals $1_n$, $1_m$. One end of the input waveguide 2 (a left end of FIG. 1) is defined as a input port P1, and one end of each output waveguide $3_1$, $3_2$, ... (a left end of FIG. 1) is defined as a drop port $P3_1$, $P3_2$, ..., respectively.

Each output waveguides $3_1$, $3_2$, ... is disposed alongside the input waveguide 2, and each resonator $4_1$, $4_2$, ... is disposed between the input waveguide 2 and an intermediate part of each output waveguide $3_1$, $3_2$, ..., and each resonator has a resonant frequency $\omega_{01}$, $\omega_{02}$, .... In this electromagnetic wave frequency filter, when electromagnetic waves of a plurality of frequencies are made incident to the input port P1, an electromagnetic wave of a predetermined frequency matching each resonant frequency $\omega_{01}$, $\omega_{02}$, ... out of the electromagnetic waves of the plurality of frequencies is transmitted from the input waveguide 2 to each output waveguide $3_1$, $3_2$, ... through each resonator $4_1$, $4_2$, ..., and is outputted from each drop port $P3_1$, $P3_2$, ... of the output waveguides $3_1$, $3_2$, .... Each resonant frequency $\omega_{01}$, $\omega_{02}$, ... of the resonators $4_1$, $4_2$, ... is different from the others, and for example, an electromagnetic wave of a frequency (a first predetermined frequency) matching the resonant frequency $\omega_{01}$ of the resonator $4_1$ is outputted (emitted) from the drop port $P3_1$ of the output waveguide $3_1$ through the resonator $4_1$, and an electromagnetic wave of a frequency (a second predetermined frequency) matching the resonant frequency $\omega_{02}$ of the resonator $4_2$ is outputted from the drop port $P3_2$ of the output waveguide $3_2$ through the resonator $4_2$. The intermediate part of each output waveguide $3_1$, $3_2$, ... is parallel to the input waveguide 2.

Each of the two-dimensional photonic crystals $1_1$, $1_2$, ... is a so-called slab type two-dimensional photonic crystal comprising slabs $11_1$, $11_2$, ... made of a high-refractive-index medium, such as Si, and uniform low-refractive-index mediums, such as air and $SiO_2$, sandwiching both sides of the thickness direction of the high-refractive-index medium therebetween. In a plane of the two-dimensional photonic crystal, light is confined by a photonic bandgap, and in the thickness direction thereof, light is confined by total reflection. In each of the two-dimensional photonic crystals $1_1$, $1_2$, ..., a number of round holes $12_1$, $12_2$, ... are arranged so as to have two-dimensional periodic structure in a plane perpendicular to the thickness direction of the slabs $11_1$, $11_2$, ..., and the high-refractive-index medium constituting the slab $11_1$, $11_2$, ... and the low-refractive-index medium which is air in the round holes $12_1$, $12_2$, ... constitute the two-dimensional photonic crystals $1_1$, $1_2$, ... having the refractive-index periodic structure. Concretely speaking, each of the photonic crystals $1_1$, $1_2$, ... is formed by creating the round holes $12_1$, $12_2$, ... at each lattice point of a hypothetical two-dimensional triangular lattice whose unit lattice is a regular triangle, in each slab $11_1$, $11_2$, .... In other words, the round holes $12_1$, $12_2$, ... are arranged in a triangular lattice form in the plane perpendicular to the thickness direction of each slab $11_1$, $11_2$, ....

In the electromagnetic wave frequency filter of this embodiment, the refractive-index periodic structures of each pair of two-dimensional photonic crystals $1_n$, $1_m$ have a scaling relation therebetween, and a period in the arranging direction of the round holes $12_m$ (m=n+1, n=1, 2, ...) in the two-dimensional photonic crystal $1_m$ is set smaller by a few % (for example, 1.2%) than a period in the arranging direction of the round holes $12_n$ (n=1, 2, ...) in the two-dimensional photonic crystal $1_n$ so as to form the in-plane heterostructure by using each pair of two-dimensional photonic crystals $1_n$, $1_m$.

In more detail, in this embodiment, an optical communication wavelength range such as the C-band (1530 nm-1565 nm) and the L-band (1565 nm-1625 nm) is assumed as a frequency band of the electromagnetic wave to be inputted into the input port P1. The period ($a_1$) in the arranging direction of the round holes $12_1$ in the two-dimensional photonic crystal $1_1$ is set to 0.42 μm, a radius of each round hole $12_1$ is set to $0.29a_1$, and a thickness of the slab $11_1$ is set to $0.6a_1$. And, in the photonic crystal $1_2$ placed beside the two-dimensional photonic crystal $1_1$, a radius of each round hole $12_2$ and a thickness of the slab $11_2$ are equal to those of the two-dimensional photonic crystal $1_1$, and the period ($a_2$) in the arranging direction of the round holes $12_2$ (in other words, a period of the refractive-index periodic structure of the two-dimensional photonic crystal $1_2$, which is a distance between the lattice points of the two-dimensional triangular lattice) is set smaller by 1.2% than the period $a_1$ of the round holes $12_1$ of the two-dimensional photonic crystal $1_1$. By setting the periods $a_1$, $a_2$ in the arranging direction of the round holes $12_1$, $12_2$ to such values, a photonic bandgap, which is a wavelength range in which any electromagnetic waves (light) in the above frequency band launched thereinto from various directions within a two-dimensional plane can not be propagated, can be formed. The input waveguide 2, the output waveguides $3_1$, $3_2$, ..., and the resonators $4_1$, $4_2$, ... each are formed by skipping an appropriate number of round holes $12_1$, $12_2$, .... In this embodiment, although each output waveguide $3_1$, $3_2$, ... has a bending part, the electromagnetic waves can be propagated in the output waveguides without radiation loss, because stationary propagation of the light in the photonic bandgap is inhibited in all directions within the two-dimensional plane in the two-dimensional photonic crystals $1_1$, $1_2$, .... The values of the periods $a_1$, $a_2$, ... of the round holes $12_1$, $12_2$, ... and the radius of each round hole $12_1$, $12_2$, ... are not limited to those values especially. Each period $a_1$, $a_2$, ... may be a period of the order of the wavelength of the electromagnetic wave in the above frequency band (for example, it is around a half wavelength of the electromagnetic wave.).

In this embodiment, the electromagnetic waves in the above mentioned optical communication wavelength range is assumed to be used, and the electromagnetic wave frequency filter is formed by using a so-called SOI (Silicon On Insulator) substrate having a silicon dioxide film (an implanted dioxide film), which is a insulating film, in the intermediate part of the thickness direction thereof. The two-dimensional photonic crystals $1_1$, $1_2$, ..., the input waveguide 2, the output waveguides $3_1$, $3_2$, ..., and the resonator $4_1$, $4_2$, ... in the electromagnetic wave frequency filter of this embodiment are formed by processing a silicon layer of a main surface side of the SOI substrate using a lithography technology and an etching technology. Therefore, the two-dimensional photonic crystals $1_1$, $1_2$, ..., the input waveguide 2, the output waveguides $3_1$, $3_2$, ..., and the resonator $4_1$, $4_2$, ... can be formed relatively easily. For example, a resist layer patterned in a desired shape is formed on a silicon layer of a main surface side of a commercial SOI wafer, and then the silicon layer is etched by a dry etching machine so that portions corresponding to the input waveguide 2, the output waveguides $3_1$, $3_2$, ..., the resonators $4_1$, $4_2$, ..., and the slabs $11_1$, $11_2$, ... are remained and portions corresponding to the round holes $12_1$, $12_2$, ... are removed. As a result, the two-dimensional photonic crystals $1_1$, $1_2$, ..., the input waveguide 2, the output waveguides $3_1$, $3_2$, ..., and the resonator $4_1$, $4_2$, ... can be formed concurrently. In the optical communication wavelength range of the C-band and the L-band and so on, the refractive index of Si is about 3.4, and that of $SiO_2$ is about 1.5, and that of air is 1, and therefore the relative refractive index difference between the slabs $11_1$, $11_2$, ... and the clad on both sides thereof becomes 55-70%, which is a very large value compared to the relative refractive index difference between the core and the clad in a typical optical fiber (0.3%). So, as compared with an optical fiber, a light confinement effect can be increased, and the filter can be miniaturized.

As mentioned above, in the electromagnetic wave frequency filter of this embodiment, the in-plane heterostructure is formed by each pair of two-dimensional photonic crystals $1_n$, $1_m$, and waveguide modes of the input waveguide 2 and the output waveguide $3_n$ (n=1, 2, ... ), which are formed astride the pair of two-dimensional photonic crystals $1_n$, $1_m$, are different in the two-dimensional photonic crystals $1_n$ and $1_m$. So, some frequency out of the plurality of frequencies propagated through portions of the waveguides 2, $3_n$ formed in the two-dimensional photonic crystal $1_n$ can not be propagated through portions of the waveguides 2, $3_n$ formed in the two-dimensional photonic crystal $1_m$, and they are reflected. The resonant frequency is set so as to be matched to the reflected frequency. That is, in the electromagnetic wave frequency filter of this embodiment, the resonant frequency of the resonator $4_n$ (n=1, 2, ... ) formed in the two-dimensional photonic crystal $1_n$ is included in a frequency band having no waveguide mode in the two-dimensional photonic crystal $1_m$, and, in the vicinity of a boundary between the two-dimensional photonic crystals $1_n$, $1_m$, an input-waveguide-side reflector $21_n$ (n=1, 2, ... ) for reflecting the electromagnetic wave having frequency matching the resonant frequency of the resonators $4_n$ (n=1, 2, ... ) formed in the two-dimensional photonic crystal $1_n$ is formed by a boundary between the portion of the input waveguide 2 formed in the two-dimensional photonic crystal $1_n$ (hereinafter, called a former side two-dimensional photonic crystal $1_n$) and the portion of the input waveguide 2 formed in the two-dimensional photonic crystal $1_m$ (hereinafter, called latter side two-dimensional photonic crystal $1_m$), and an output-waveguide-side reflector $31_n$ (n=1, 2, ... ) for reflecting the electromagnetic wave having frequency matching the resonant frequency of the resonators $4_n$ (n=1, 2, ... ) is formed by a boundary between the portion of the output waveguide $3_1$ formed in the former side two-dimensional photonic crystal $1_n$ and the portion of the output waveguide 3 formed in the latter side two-dimensional photonic crystal $1_m$.

That is, in the electromagnetic wave frequency filter of this embodiment, one end of the input waveguide 2 is defined as the input port P1, and one end of each output waveguide $3_1$, $3_2$, ... is defined as the drop port $P3_1$, $P3_2$, ..., respectively, and the input-waveguide-side reflectors $21_1$, ... for reflecting the electromagnetic wave of the resonant frequency of each of the resonators $4_1$, $4_2$, ... are provided in the input waveguide 2 on the opposite side of the one end of the input waveguide 2 from each resonator $4_1$, $4_2$, ..., and the output-waveguide-side reflectors $31_1$, ... for reflecting the electromagnetic wave of the resonant frequency of each resonator $4_1$, $4_2$, ... are provided on the opposite side of each output waveguide $3_1$, $3_2$, ....

Therefore, in the electromagnetic wave frequency filter of this embodiment, the electromagnetic waves transmitted from the input waveguide 2 to each output waveguide $3_1$, $3_2$, ... through each resonator $4_1$, $4_2$, ... and propagated toward the opposite end of each drop port $P3_1$, $P3_2$, ... of each output waveguide $3_1$, $3_2$, ... are reflected by each output-waveguide-side reflector $31_1$, ..., and, the electromagnetic waves transmitted from the input waveguide 2 to each resonator $4_1$, $4_2$, ... and then moved back to the input waveguide 2 and then propagated toward the opposite end of the input port P1 of the input waveguide 2, as well as the electromagnetic waves matching the resonant frequency of each resonator $4_1$, $4_2$, ... and propagated toward the opposite end of the input waveguide 2 without being transmitted to each resonator $4_1$, $4_2$, ..., are reflected by each input-waveguide-side reflector $21_1$, .... In FIG. 1, an arrow of an alternate long and short dash line shows a propagation path of the electromagnetic waves of frequencies different from the resonant frequencies of the resonators $4_1$, $4_2$, ..., and an arrow of a solid line shows one example of a traveling path of the electromagnetic waves of a frequency matching the resonant frequency of the resonator $4_1$ and it is a traveling path of the electromagnetic waves reflected by the input-waveguide-side reflector $21_1$ and moved to the output waveguide $3_1$ through the resonator $4_1$ and reflected by the output-waveguide-side reflector $31_1$ and then outputted from the output port $3_1$.

In the electromagnetic wave frequency filter of this embodiment, when a distance between the resonator $4_1$ and the input-waveguide-side reflector $21_1$ in the direction along the input waveguide 2 is represented as $d_1$, a distance between the resonator $4_1$ and the output-waveguide-side reflector $31_1$ in the direction along the output waveguide $3_1$ is represented as $d_2$, a propagation constant of the input waveguide 2 is represented as $\beta_1$, a propagation constant of the output waveguide $3_1$ is represented as $\beta_2$, a reflection phase shift of the electromagnetic wave reflected by the input-waveguide-side reflector $21_1$ is represented as $\Delta_1$, a reflection phase shift of the electromagnetic wave reflected by the output-waveguide-side reflector $31_1$ is represented as $\Delta_2$, a phase shift amount of the electromagnetic wave reflected by the input-waveguide-side reflector $21_1$ and returned to near the resonator $4_1$ is represented as $\theta_1$, and a phase shift amount of the electromagnetic wave reflected by the output-waveguide-side reflector $31_1$ and returned to near the resonator 41 is represented as $\theta_2$, the phase shift amounts $\theta_1$ and $\theta_2$ each are calculated by the equations:

$$\theta_1 = 2\beta_1 \times d_1 + \Delta_1$$

$$\theta_2 = 2\beta_2 \times d_2 + \Delta_2$$

and furthermore, a drop efficiency D of the drop port $P3_1$ can be calculated by using the mode-coupling theory and is expressed by the following equation 1:

$$D = \left|\frac{s_{-3}}{s_{+1}}\right|^2 \qquad \text{[equation 1]}$$

$$= \frac{\frac{4}{\{Q_{inb}/(1-\cos\theta_1)\} \cdot \{Q_{inr}/(1-\cos\theta_2)\}}}{4\left(\frac{\omega-\omega_0'}{\omega_0}\right)^2 + \left\{\frac{1}{Q_v} + \frac{1}{Q_{inb}/(1-\cos\theta_1)} + \frac{1}{Q_{inr}/(1-\cos\theta_2)}\right\}^2}$$

-continued $$\omega' = \omega_0\left(1 - \frac{\sin\theta_1}{2Q_{inb}} - \frac{\sin\theta_2}{2Q_{inr}}\right)$$

where $Q_{inb}$ is a Q-factor between the resonator $4_1$ and the input waveguide 2, $Q_{inr}$ is a Q-factor between the resonator $4_1$ and the output waveguide $3_1$, $\omega$ is a frequency of the electromagnetic wave, $\omega_0$ is the resonant frequency of the resonator $4_1$, $s_{+1}$ is an amplitude of the electromagnetic wave of a predetermined frequency matching the resonant frequency of the resonator $4_1$ out of the electromagnetic waves inputted into the input waveguide 2 through the input port P1, and $s_{-3}$ is an amplitude of the electromagnetic wave outputted from the output port $P3_1$.

In the above equation, because the resonator $4_1$ of the electromagnetic wave frequency filter of this embodiment is formed by creating defects in the refractive-index periodic structure of the slab type two-dimensional photonic crystal $1_1$, and the defects are so-called donor type defects, which were formed by charging a semiconducting material into parts of the two-dimensional photonic crystal $1_1$ where round holes $12_1$ were expected to be formed in the refractive-index periodic structure (in this embodiment, the donor type defects were formed by charging Si into two round holes $12_1$), the radiation loss to the free space is low and a high $Q_v$ ($Q_{inb}/(1-\cos\theta_1) \ll Q_v$) can be obtained. Thus, $1/Q_v$ in the above equation is negligible as zero. Therefore, when each parameter d1, d2, $\beta_1$, $\beta_2$, $\Delta_1$, $\Delta_2$, $\theta_1$, $\theta_2$, $Q_{inb}$, $Q_{inr}$, and $Q_v$ is set to meet the following condition:

$Q_{inb}/(1-\cos\theta_1)=Q_{inr}/(1-\cos\theta_2)$ $\theta_1, \theta_2 \neq 2N\pi (N=0, 1, \ldots)$, the drop efficiency D can be almost 1, namely, almost 100%. That is, as compared with the conventional filter, it becomes possible for the electromagnetic wave frequency filter of this embodiment to improve the drop efficiency by a comparatively easy design. In addition, it was reported that a resonator formed by creating donor type defects in a two-dimensional photonic crystal has a high Q-factor $Q_v$ by, for example, a publication (Y. Akahane et al., Great improvement of Q-factor by shifting lattice points of a two-dimensional photonic crystal slab point defect resonator (in Japanese), Extended Abstracts of the 50th Japan Society of Applied Physics and Related Societies, 29a-YN-9 (March, 2003)) and a publication (Y. Akahane, et al., Design of channel drop filter by using a donor-type cavity with high-quality factor in a two-dimensional photonic crystal slab, APPLIED PHYSICS LETTERS, VOL. 82, No. 9, 2003, p. 1341-1343). In the former, it was reported that $Q_v$ of 45000 can be obtained, and in the latter, it was reported that $Q_v$ of 5000 can be obtained.

Figure 2:
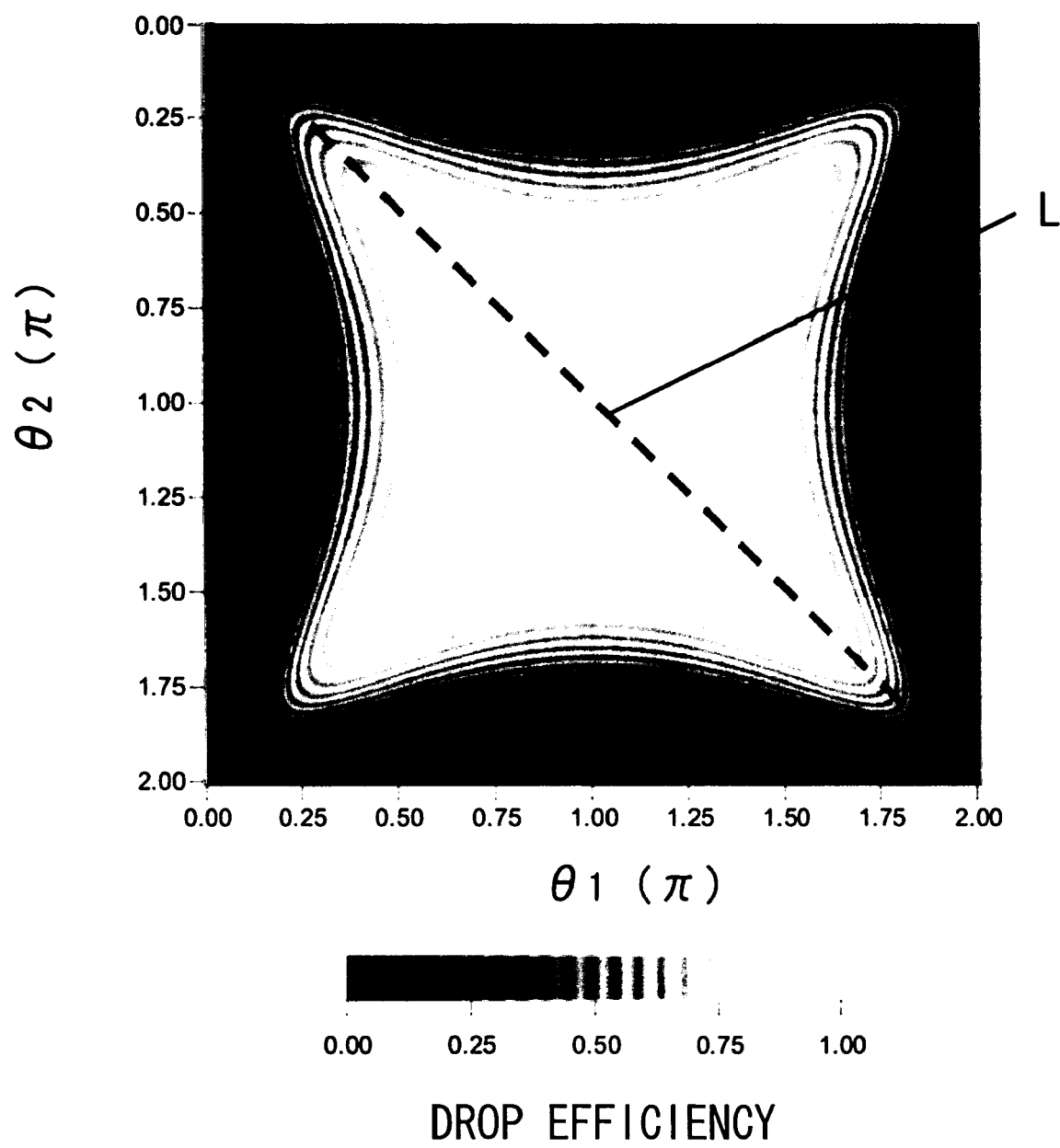
FIG. 2 is a characteristic evaluation view of the first embodiment.

In the electromagnetic wave frequency filter of this embodiment, positions of the resonators $4_1$, $4_2$, . . . are set so that all resonators $4_1$, $4_2$, . . . are arranged on a straight line running along the arranging direction of the two-dimensional photonic crystals $1_1$, $1_2$, . . . , and the distance between each resonator and the input waveguide 2 and the distance between each resonator and each output waveguide are set equal to each other, so as to make the Q-factors $Q_{inb}$ and $Q_{inr}$ equal to each other ($Q_{inb}=Q_{inr}$). Furthermore, the phase shift amounts $\theta_1$ and $\theta_2$ are set equal ($\theta_1=\theta_2$) by setting $d_1=d_2$, $\Delta_1=\Delta_2$, and $\beta_1=\beta_2$. So, because $\cos\theta_1=\cos\theta_2$, the phase shift amounts $\theta_1$, $\theta_2$ and the drop efficiency D have a relation shown in FIG. 2. In FIG. 2, the horizontal axis indicates the phase shift amount $\theta_1$ and the vertical axis indicates the phase shift amount $\theta_2$, and the drop efficiency D is represented by contour lines in a gray scale, in which the drop efficiency D becomes lower as the color approaches black and it becomes higher as the color approaches white. In the electromagnetic wave frequency filter of this embodiment, the reflection phase shifts $\Delta_1$ and $\Delta_2$ are set equal to each other ($\Delta_1=\Delta_2$) by setting an amount of axis misalignment between the portion of the input waveguide 2 formed in the two-dimensional photonic crystal $1_1$ and the portion of the input waveguide 2 formed in the two-dimensional photonic crystal $1_2$ and an amount of axis misalignment of the output waveguide $3_1$ between the portion of the output waveguide $3_1$ formed in the two-dimensional photonic crystal $1_1$ and the portion of the output waveguide $3_1$ formed in the two-dimensional photonic crystal $1_2$ equal to each other. So, $\theta_1=\theta_2$, then $\theta_1$ and $f_2$ change along a dashed line L in response to the change of the distance $d_1$ ($=d_2$). Therefore, fluctuation range of the drop efficiency (namely, wavelength selection efficiency) for fluctuations of the phase shift amounts $\theta_1$, $\theta_2$ is low, so a margin for the fluctuations of the phase shift amounts $\theta_1$, $\theta_2$ can be increased.

It should be noted that, although the above equation 1 is an equation for seeking the drop efficiency of the drop port $P3_1$, the same relational expression can be established for other drop ports $P3_2$, . . . .

As mentioned above, in the electromagnetic wave frequency filter of this embodiment, it is possible to increase the drop efficiency (the wavelength selection efficiency) as compared with conventional electromagnetic wave frequency filter, when the electromagnetic wave of a predetermined frequency matching the resonant frequency of each resonator $4_1$, $4_2$, . . . out of the electromagnetic waves of a plurality of frequencies inputted into the input waveguide 2 is extracted from each drop port $P3_1$, $P3_2$, . . . of the output waveguides $3_1$, $3_2$, . . . . Furthermore, because the drop efficiency can be increased in a symmetric structure with respect to the resonators $4_1$, $4_2$, . . . where the distance between each resonator $4_1$, $4_2$, . . . and the input waveguide 2 and the distance between each resonator $4_1$, $4_2$, . . . and each output waveguide $3_1$, $3_2$, . . . are set equal, it is easy to design the electromagnetic wave frequency filter.

Although Si was adopted in this embodiment as a high refractive index medium constituting the slab $11_1$, $11_2$, . . . of the two-dimensional photonic crystal $1_1$, $1_2$, . . . , it is not limited to Si, but it may be other materials, such as GaAs, InP.

Second Embodiment

In the electromagnetic wave frequency filter of the first embodiment, the resonators $4_1$, $4_2$, . . . was disposed so that all resonators $4_1$, $4_2$, . . . were arranged on a straight line, and the periods of the refractive-index periodic structure in each pair of two-dimensional photonic crystals $1_n$, $1_m$ (n=1, 2, . . . , m=n+1) adjacent to each other in the arranging direction of these two-dimensional photonic crystals $1_1$, $1_2$, . . . were different from each other. So, the input waveguide 2 had the axis misalignment (the misalignment of the optical axis) between the portion of the input waveguide formed in the former two-dimensional photonic crystal $1_n$ (in FIG. 1, in the two-dimensional photonic crystal $1_1$) and the portion of the input waveguide formed in the latter two-dimensional photonic crystal $1_m$ (in FIG. 1, in the two-dimensional photonic crystal $1_2$). As a result, reflection losses resulting from the axis misalignment of the input waveguide 2 were generated to the electromagnetic waves of the frequencies different from the resonant frequency of the resonator $4_n$ (in FIG. 1, the resonator $4_1$), whereby, in a case where a plurality of drop ports $P3_1$, $P3_2$, . . . were arranged along the longitudinal direction of the input waveguide 2, the drop efficiency (the wavelength selection efficiency) of the posterior drop port $P3_2$, . . . became lower with decreasing proximity to the drop port $P3_1$.

Figure 3:
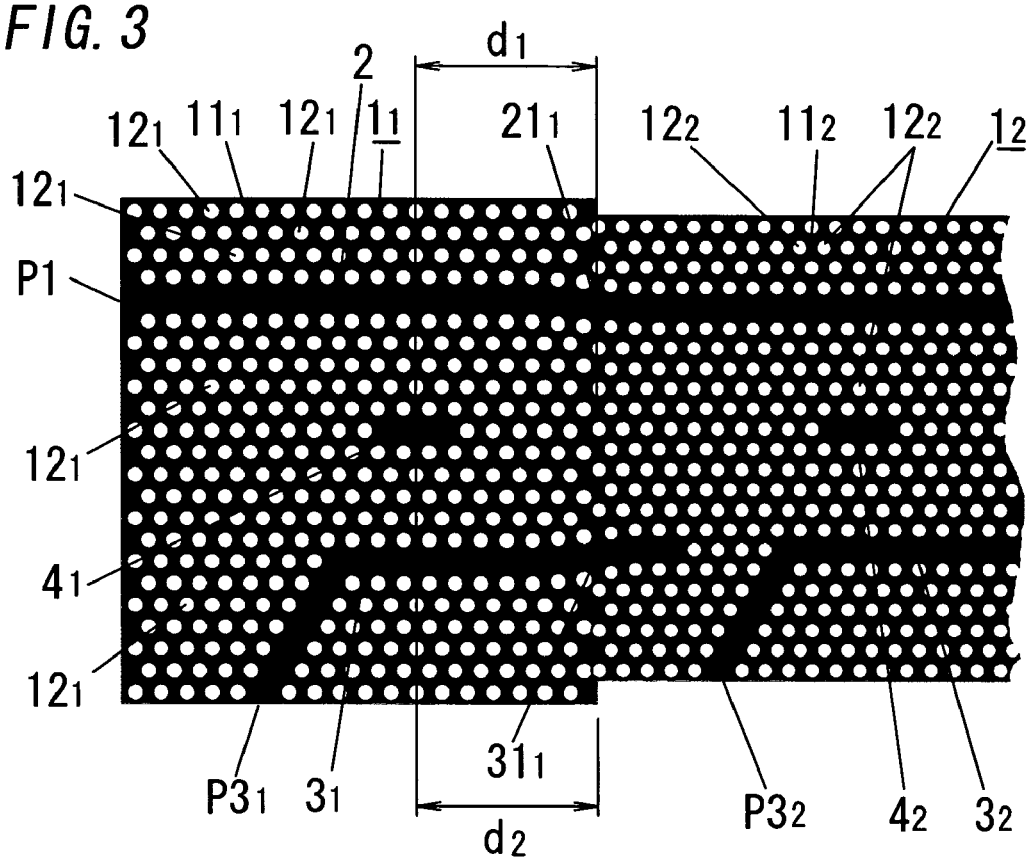
FIG. 3 is a schematic plan view showing a second embodiment of the present invention.

In contrast to this, in this embodiment, as shown in FIG. 3, in the vicinity of the boundary of each pair of two-dimensional photonic crystals $1_n$, $1_m$ (n=1, 2, . . . , m=n+1) adjacent to each other in the arranging direction of the two-dimensional photonic crystals $1_1$, $1_2$, . . . , both periods of the refractive-index periodic structures of the former two-dimensional photonic crystal $1_n$ (in FIG. 1, the two-dimensional photonic crystal $1_1$) and the latter two-dimensional photonic crystal $1_m$ (in FIG. 1, the two-dimensional photonic crystal $1_2$) are changed in stages so that the input waveguide 2 extends smoothly and continuously near the boundary. The basic configuration of the electromagnetic wave frequency filter of this embodiment is the same as the first embodiment, so similar parts to the first embodiment are identified by the same reference character and no duplicate explanation is made here.

In the electromagnetic wave frequency filter of this embodiment, because the input waveguide 2 extends smoothly and continuously near the boundary of each pair of two-dimensional photonic crystals $1_n$, $1_m$ (n=1, 2, . . . , m=n+1) adjacent to each other in the arranging direction of the plurality of two-dimensional photonic crystals $1_1$, $1_2$, . . . , the reflection loss resulting from the axis misalignment of the input waveguide 2 to the electromagnetic waves of the frequencies different from the resonant frequency of the resonator $4_n$ formed in the former two-dimensional photonic crystal $1_n$ can be reduced, whereby the drop efficiency of the posterior drop port $P3_2$, . . . can be increased, as compared with the first embodiment.

Although both periods of the refractive-index periodic structure of the former two-dimensional photonic crystal $1_n$ and the latter two-dimensional photonic crystal $1_m$ were changed in stages in this embodiment, a period of the refractive-index periodic structure of at least one two-dimensional photonic crystal may be changed.

Third Embodiment

In the electromagnetic wave frequency filter of the second embodiment, because the input waveguide 2 extended smoothly and continuously near the boundary of each pair of two-dimensional photonic crystals $1n$, $1_m$, the reflection losses resulting from the axis misalignment of the input waveguide 2 with respect to the electromagnetic waves of the frequencies different from the resonant frequency of the resonator $4_n$ can be reduced, whereby the drop efficiency of the posterior drop port $P3_2$, . . . can be increased, as compared with the first embodiment. However, even in the electromagnetic wave frequency filter of the second embodiment, the reflection losses resulting from the axis misalignment of the input waveguide 2 are generated, so that the drop efficiency of each drop port $P3_1$, $P3_2$, . . . becomes different from each other. So, it is desired to further increase the drop efficiency (wavelength selection efficiency) of the posterior drop port $P3_2$, . . . .

Figure 4:
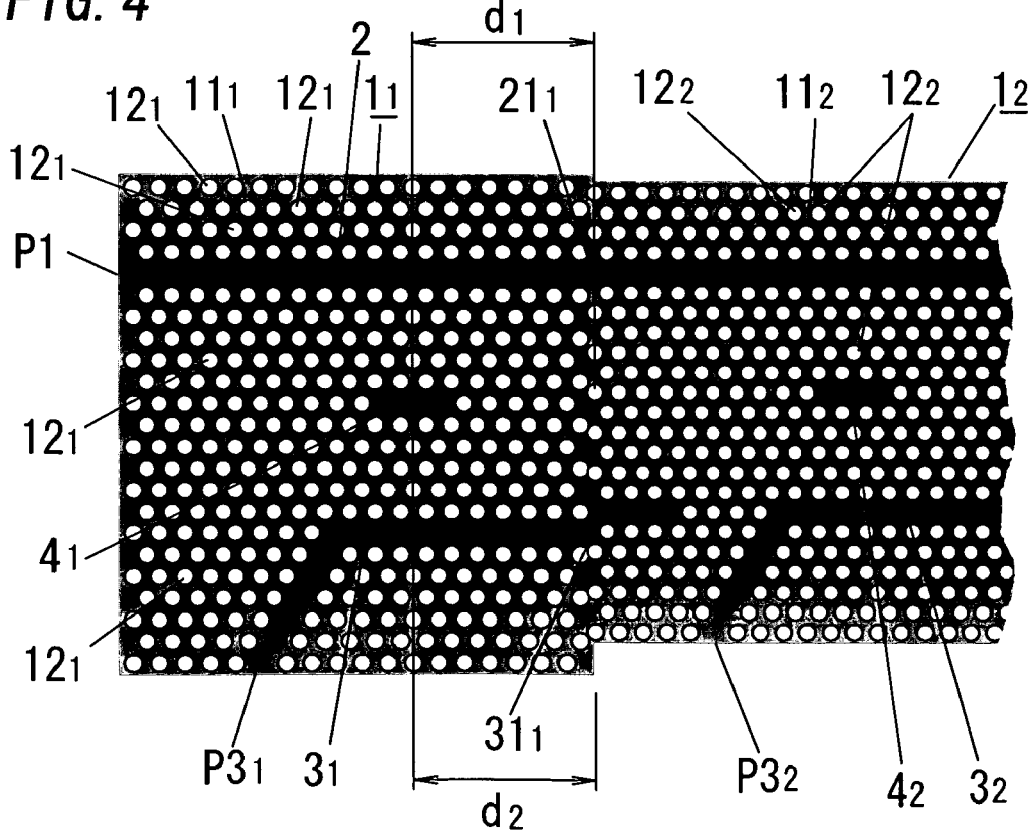
FIG. 4 is a schematic plan view showing a third embodiment of the present invention.

The electromagnetic wave frequency filter of this embodiment has the same basic configuration as the first and second embodiments except that, as shown in FIG. 4, the optical axes of the portions of the input waveguide 2 formed in each photonic crystal $1_1$, $1_2$, . . . are conformed to each other so that the axis misalignment is not generated near the boundary of each pair of two-dimensional photonic crystals $1_n$, $1_m$ (n=1, 2, . . . , m=n+1) adjacent to each other in the arranging direction of the plurality of two-dimensional photonic crystals $1_1$, $1_2$, . . . Although the resonators $4_1$, $4_2$, . . . were disposed on a straight line in the first and second embodiments, the resonators of this embodiment are not disposed on a straight line so as to make the optical axis of the input waveguide 2 dispose on one straight line, and relative positions of the resonators $4_1$, $4_2$, . . . of this embodiment are different from that of the first and second embodiments. Similar parts to the first and second embodiments are identified by the same reference character and no duplicate explanation is made here.

In the electromagnetic wave frequency filter of this embodiment, because there is no axis misalignment of the input waveguide 2 near the boundary of each pair of two-dimensional photonic crystals $1_n$, $1_m$ (n=1, 2, . . . , m=n+1) adjacent to each other in the arranging direction of the plurality of two-dimensional photonic crystals $1_1$, $1_2$, . . . , the reflection loss resulting from the axis misalignment of the input waveguide 2 with respect to the electromagnetic waves of the frequencies different from the resonant frequency of the resonator $4_n$ formed in the former two-dimensional photonic crystal $1_n$ can be eliminated, whereby the drop efficiency of each drop port $P3_1$, $P3_2$, . . . can be evened.

Figure 5:
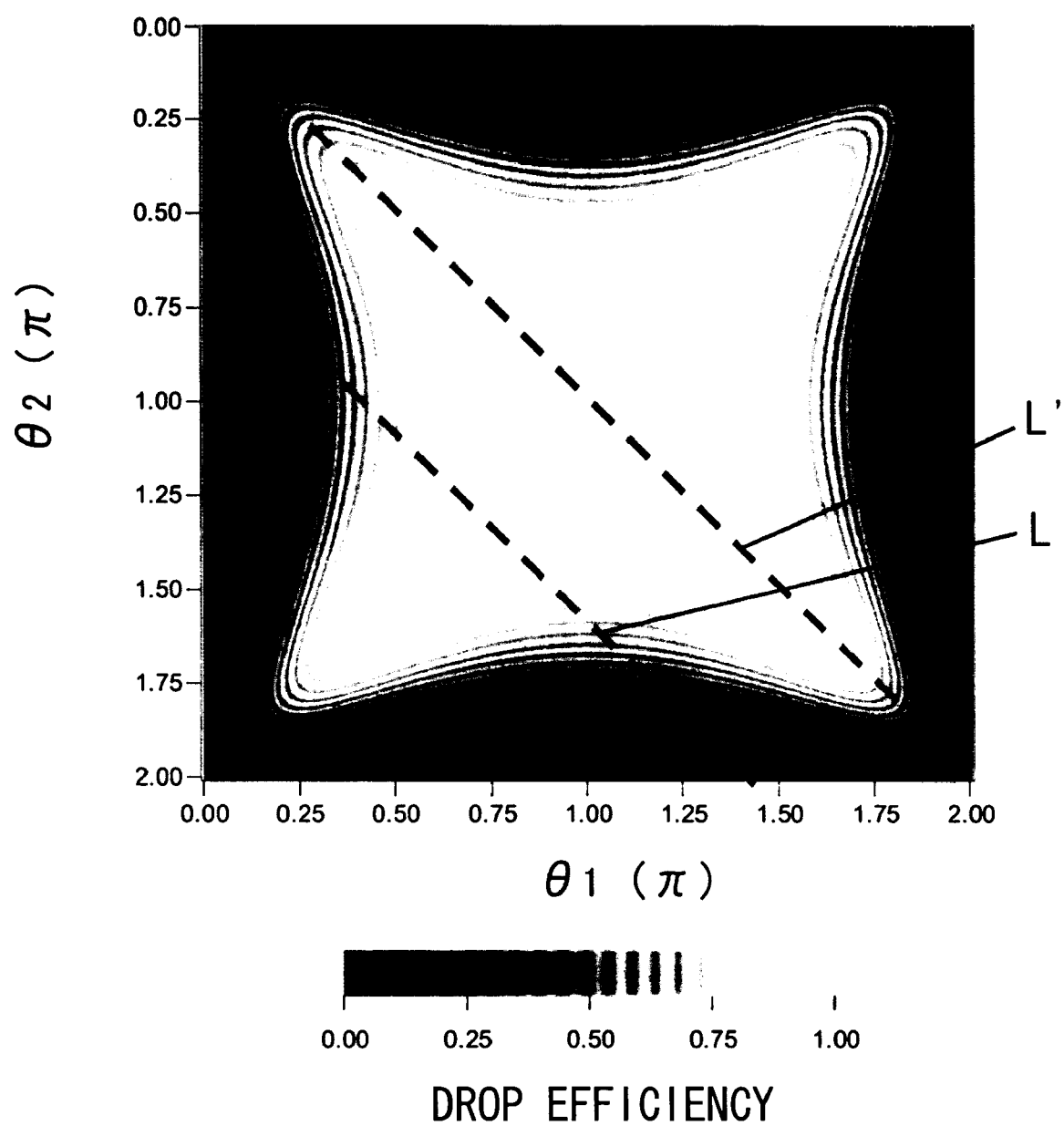
FIG. 5 is a characteristic evaluation view of the third embodiment.

By the way, FIG. 5 shows a relationship between $\theta_1$, $\theta_2$, and the drop efficiency D of the drop port $P3_1$ of the electromagnetic wave frequency filer of this embodiment. Because $\Delta_1 \neq \Delta_2$, $\theta_1$ and $\theta_2$ change along a dashed line L of FIG. 5 in response to the change of the distance $d_1$ (=$d_2$). So, the margin for the change of the distance $d_1$ (=$d_2$) becomes lowered. How FIG. 5 is viewed is the same as FIG. 2 explained in the first embodiment.

Figure 6:
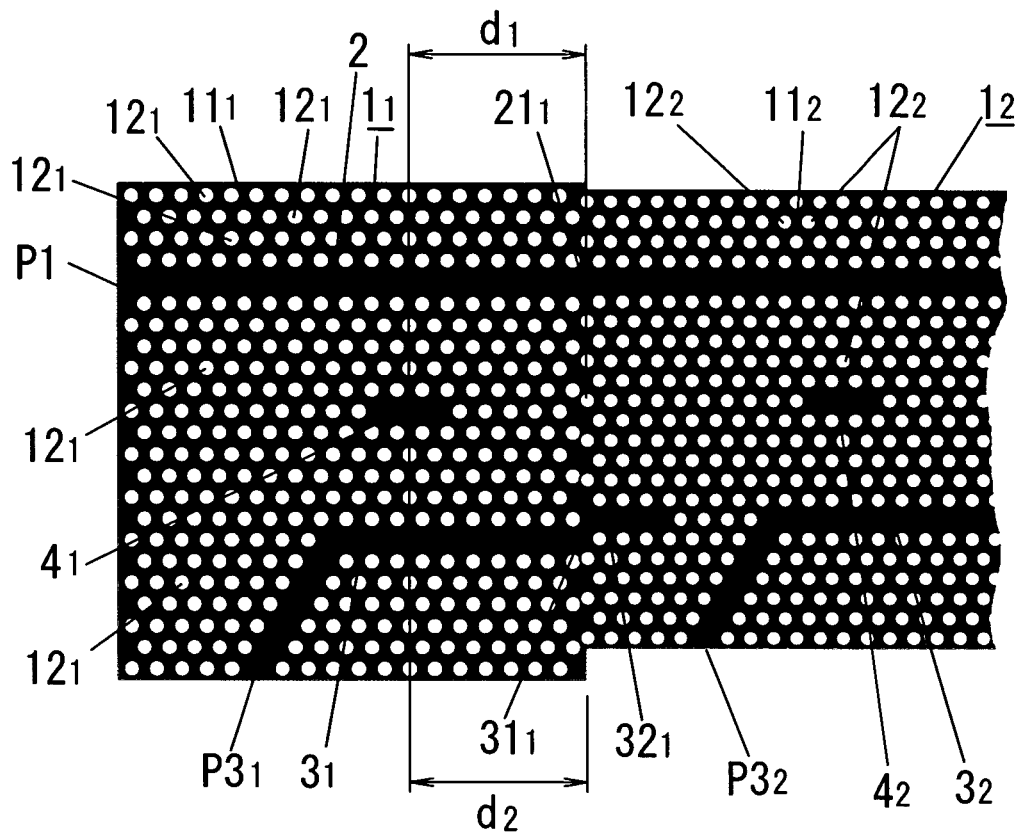
FIG. 6 is a schematic plan view showing another configuration of the third embodiment.

In contrast to this, for example, as shown in FIG. 6, a phase compensator $32_1$ which matches $\Delta_2$ to $\Delta_1$ by adjusting the period near the output-waveguide-side reflector $31_1$ may be provided at the output-waveguide-side reflector $31_1$. In this case, because $\Delta_2=\Delta_1$, it becomes possible to match the reflection efficiency of the output-waveguide-side reflector $31_1$ to the reflection efficiency of the input-waveguide-side reflector $21_1$. So, $\theta_1$ and $\theta_2$ change along a dashed line L' of FIG. 5 in response to the change of the distance $d_1$ (=$d_2$), and therefore the margin for the change of the distance $d_1$ (=$d_2$) can be increased.

Forth Embodiment

Figure 7:
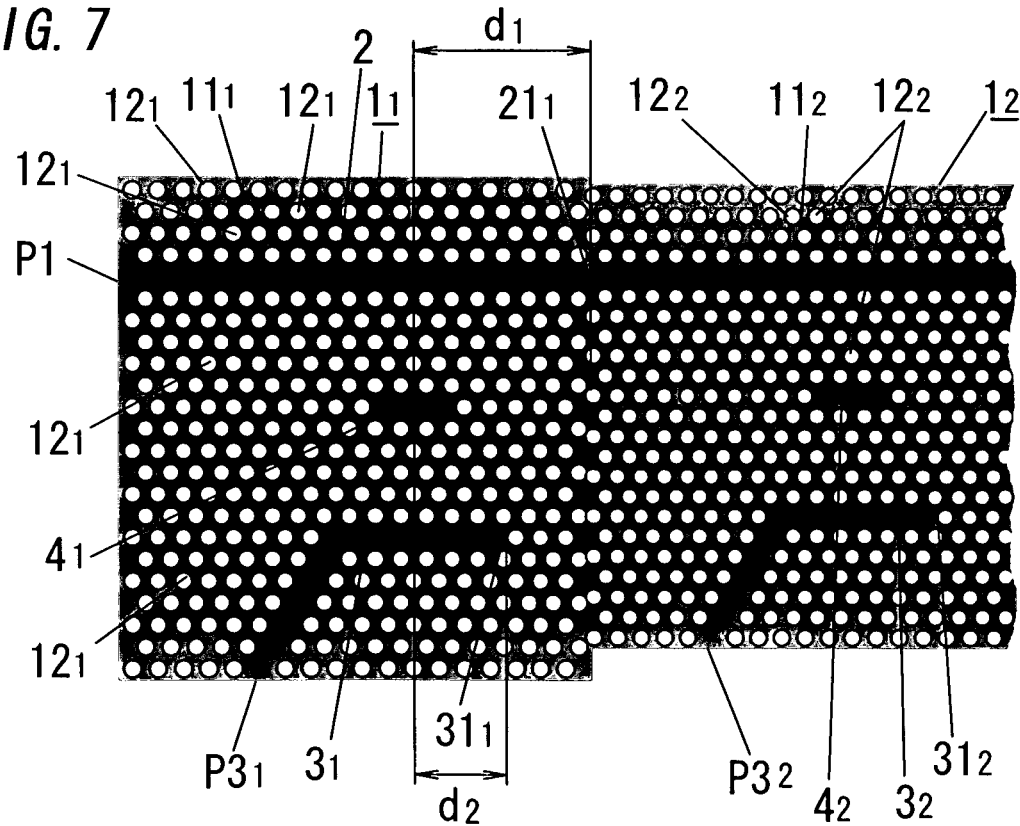
FIG. 7 is a schematic plan view showing a fourth embodiment of the present invention.

The electromagnetic wave frequency filter of this embodiment has the same basic configuration as the third embodiment except that, as shown in FIG. 7, each output waveguide $3_1$, $3_2$, . . . is formed by creating a linear defect in the refractive-index periodic structure of each two-dimensional photonic crystal $1_1$, $1_2$, . . . , and each one end of the output waveguides $3_1$, $3_2$, . . . is a drop port $P3_1$, $P3_2$, . . . , respectively, and each opposite end of the output waveguides $3_1$, $3_2$, . . . constitute the output-waveguide-side reflector $31_1$, $31_2$, . . . for reflecting the electromagnetic wave of the resonant frequency of each resonator, respectively. That is, although each output waveguide $3_1$, $3_2$, . . . of the third embodiment was formed astride the two-dimensional photonic crystals $1_n$, $1_m$ and each output-waveguide-side reflector $31_1$, $31_2$, . . . was constituted by the in-plane heterostructure of each pair of two-dimensional photonic crystals $1_n$, $1_m$, each output waveguide of this embodiment is formed in each two-dimensional photonic crystal $1_1$, $1_2$, . . . and each output-waveguide-side reflector $31_1$, $31_2$, . . . is constituted by the photonic bandgap of each two-dimensional photonic crystal $1_1$, $1_2$, . . . . In this embodiment, as to the output waveguide $3_1$, the distance $d_2$ between the resonator $4_1$ and the output-waveguide-side reflector $31_1$ in the direction along the output waveguides $3_1$ is determined so as to meet the relation: $\cos\theta_1 = \cos\theta_2$, and as to the other output waveguides $3_2$, . . . , too, the distance between each resonator $4_2$, . . . and each output-waveguide-side reflector $31_2$, . . . in the direction along the output waveguides $3_2$, . . . is determined so as to meet the same relation. The parts similar to the third embodiment are identified by the same reference character and no duplicate explanation is made here.

In the electromagnetic wave frequency filter of this embodiment, the electromagnetic waves of the resonant frequency of each resonator $4_1$, $4_2$, . . . located between the input waveguide 2 and each output waveguides $3_1$, $3_2$, . . . can be reflected by the photonic bandgap at the opposite end of each output waveguide $3_1$, $3_2$, . . . , and furthermore, the axis misalignment of each output waveguide $3_1$, $3_2$, . . . is not generated. So, the drop efficiency of each drop port $P3_1$, $P3_2$, . . . can be further improved.

Figure 8:
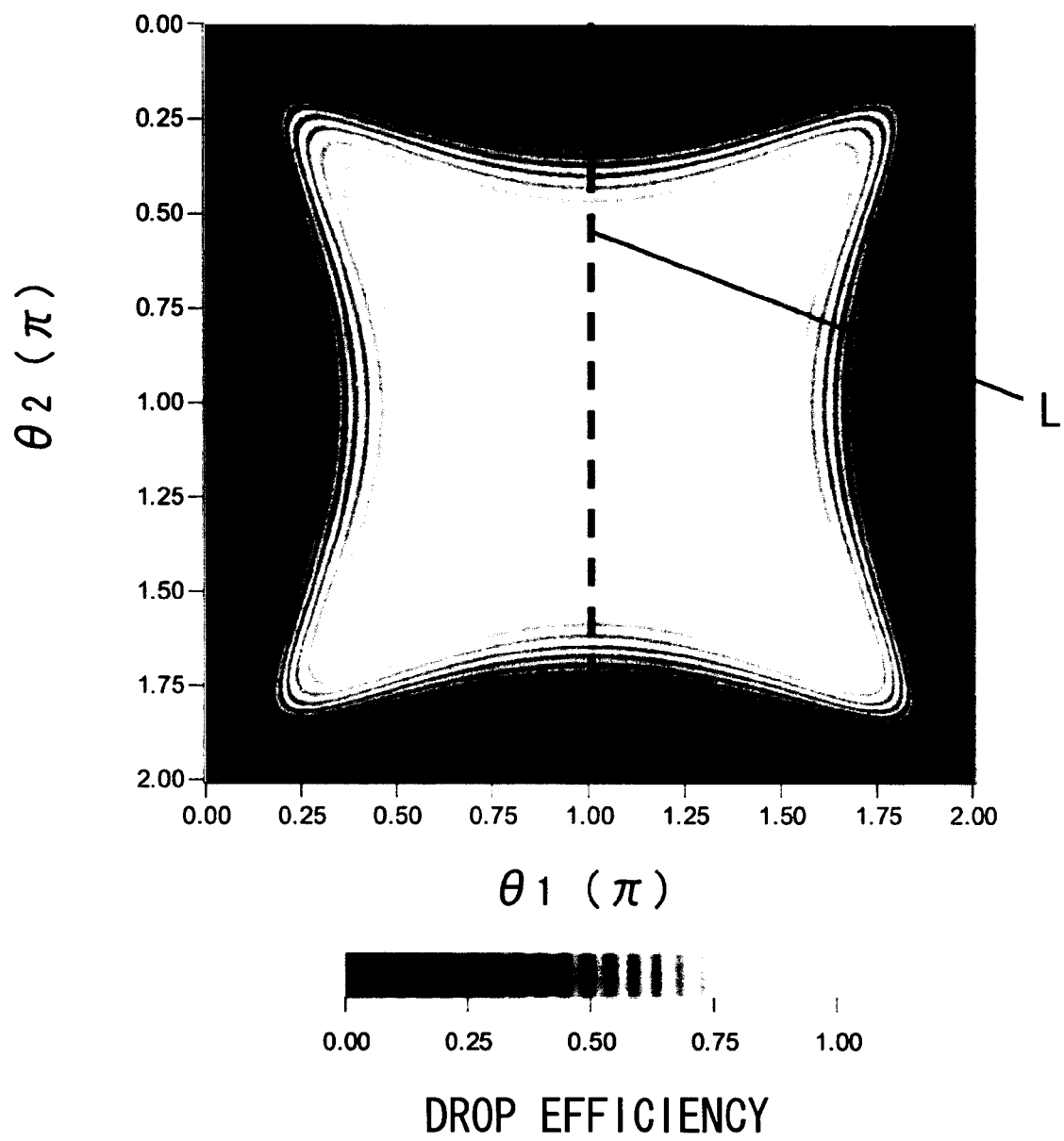
FIG. 8 is a characteristic evaluation view of the fourth embodiment.

FIG. 8 is a view showing the relation between $\theta_1$, $\theta_2$, and the drop efficiency D of the electromagnetic wave frequency filter of this embodiment, as well as FIG. 2 of the first embodiment. In FIG. 8, $\theta_2$ ($\theta_2 = 2\beta_2 \times d_2 + \Delta_2$) changes along a dashed line L of FIG. 8 in response to the change of the distance $d_2$. So, as shown in FIG. 8, the drop efficiency near 100% can be achieved by setting $d_1$ and $d_2$ to meet the relation $\cos\theta_1 = \cos\theta_2$.

Fifth Embodiment

In the electromagnetic wave frequency filter of the forth embodiment, electromagnetic field distribution changes abruptly near the opposite end of each output waveguide $3_1$, $3_2$, . . . , and therefore radiation from near the opposite end of each output waveguide $3_1$, $3_2$, . . . to the free space is prone to occur.

Figure 9A:
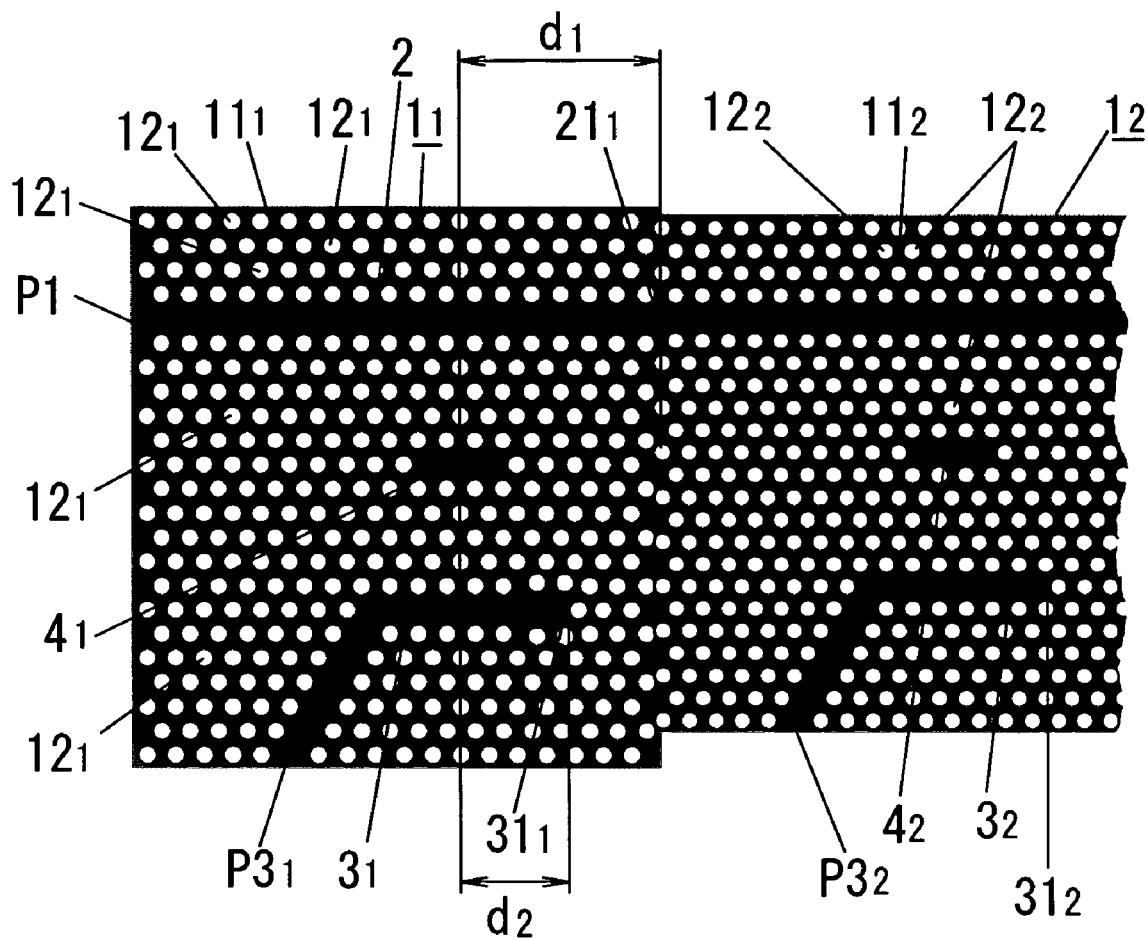
FIG. 9A is a schematic plan view showing a fifth embodiment of the present invention.
Figure 9B:
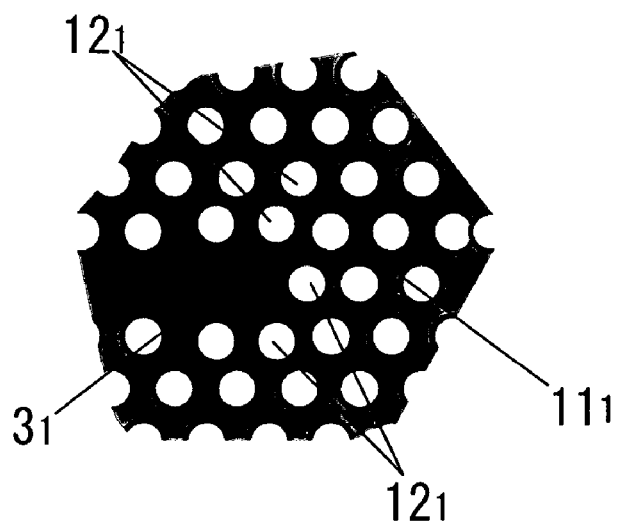
FIG. 9B is an enlarged view showing a substantial part of FIG. 9A.

In contrast to this, the electromagnetic wave frequency filter of this embodiment, as shown in FIGS. 9A and 9B, the period of the refractive-index periodic structure near the opposite end of each output waveguide $3_1$, $3_2$, . . . is varied. Concretely speaking, in this embodiment, each period of the round holes $12_1$, $12_2$, . . . in the arranging direction thereof is varied so that the electromagnetic field distribution near the opposite end of each output waveguide $3_1$, $3_2$, . . . changes gently, not abruptly. The basic configuration of the electromagnetic wave frequency filter of this embodiment is the same as the fourth embodiment, so similar parts to the fourth embodiment are identified by the same reference character and no duplicate explanation is made here.

Therefore, in the electromagnetic wave frequency filter of this embodiment, abrupt changes of the electromagnetic field distribution near the opposite end of each output waveguide $3_1$, $3_2$, . . . can be prevented, so that the radiation loss to the free space can be lowered. As a result, the drop efficiency of each drop port $P3_1$, $P3_2$, . . . can be further improved.

Sixth Embodiment

Figure 10:
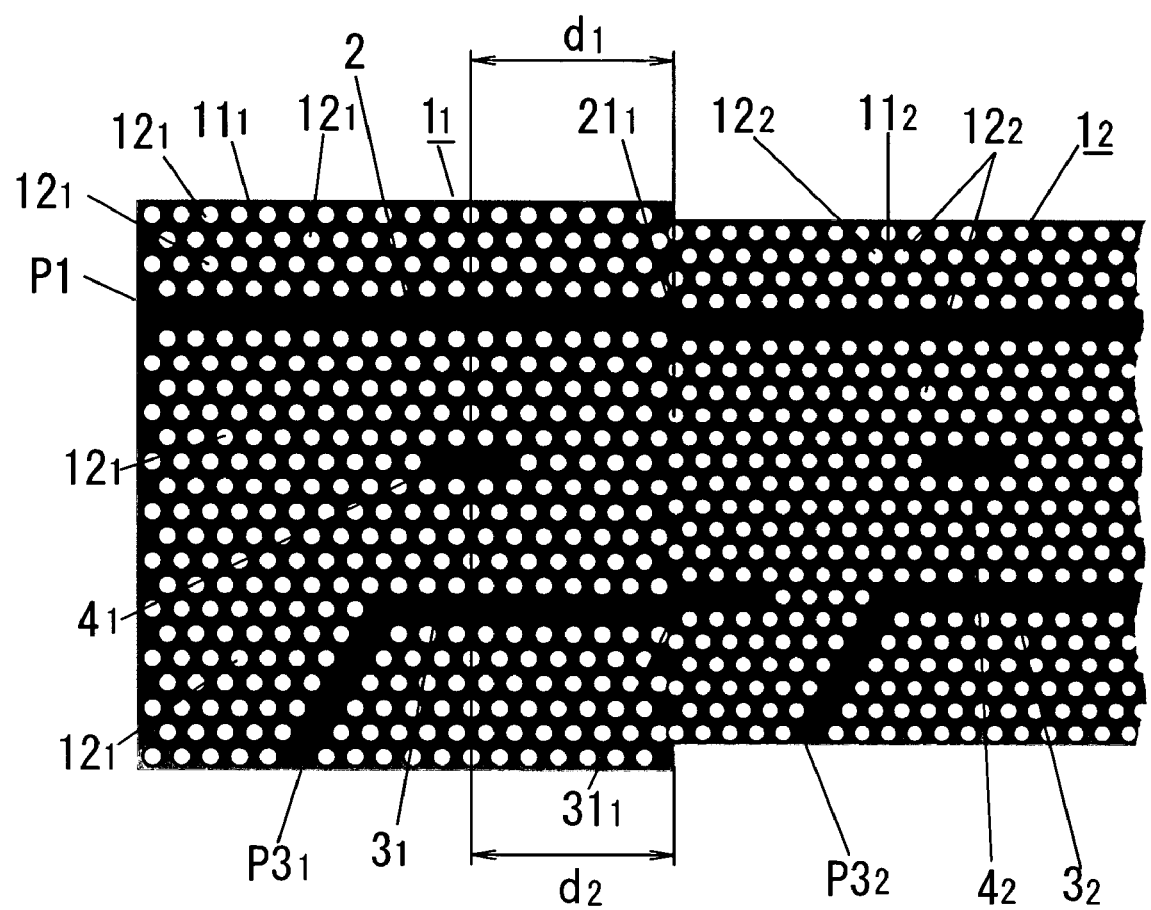
FIG. 10 is a schematic plan view showing a sixth embodiment of the present invention.

The electromagnetic wave frequency filter of this embodiment has the same basic configuration as the first embodiment, and it has the structure shown in FIG. 10. The electromagnetic wave frequency filter of this embodiment further comprises control means (not shown) for changing the outputs of the drop ports $P3_1$, $P3_2$, . . . by varying the refractive index near the output-waveguide-side reflectors $31_1$, $31_2$, . . . . In the electromagnetic wave frequency filter of this embodiment, when the refractive index near the output-waveguide-side reflector, for example, $31_1$ is changed by the control means, the propagation constant of the output waveguide $\beta_2$ and the reflection phase shift $\Delta_2$, described in the first embodiment, are changed each, and then the phase shift amount $\theta_2$ is changed. Eventually, the drop efficiency of the drop port $P3_1$ is changed. In the electromagnetic wave frequency filter of this embodiment, a material of the slabs $11_1$, $11_2$, . . . of the two-dimensional photonic crystals $1_1$, $1_2$, . . . , may be selected appropriately from materials having refractive index which is changed in response to electric field, light, heat, magnetism, and so on (in other words, a material having electro-optic effect, optical-optic effect, thermo-optic effect, magneto-optic effect, and so on), and the configuration of the control means may be decided appropriately according to the material of the slab $11_1$, $11_2$, . . . . Or, the material having refractive index which is changed in response to electric field, light, heat, magnetism, and so on may be charged into the round holes $12_1$, $12_2$, . . . , or such a material may be stacked on the output waveguides $3_1$, . . . near the output-waveguide-side reflectors $31_1$, . . . . As the semiconducting material having refractive index which is changed by control light, a semiconducting material, such as Si, GaAs, InP, InGaAsP, and AlGaAs, is known.

Figure 11:
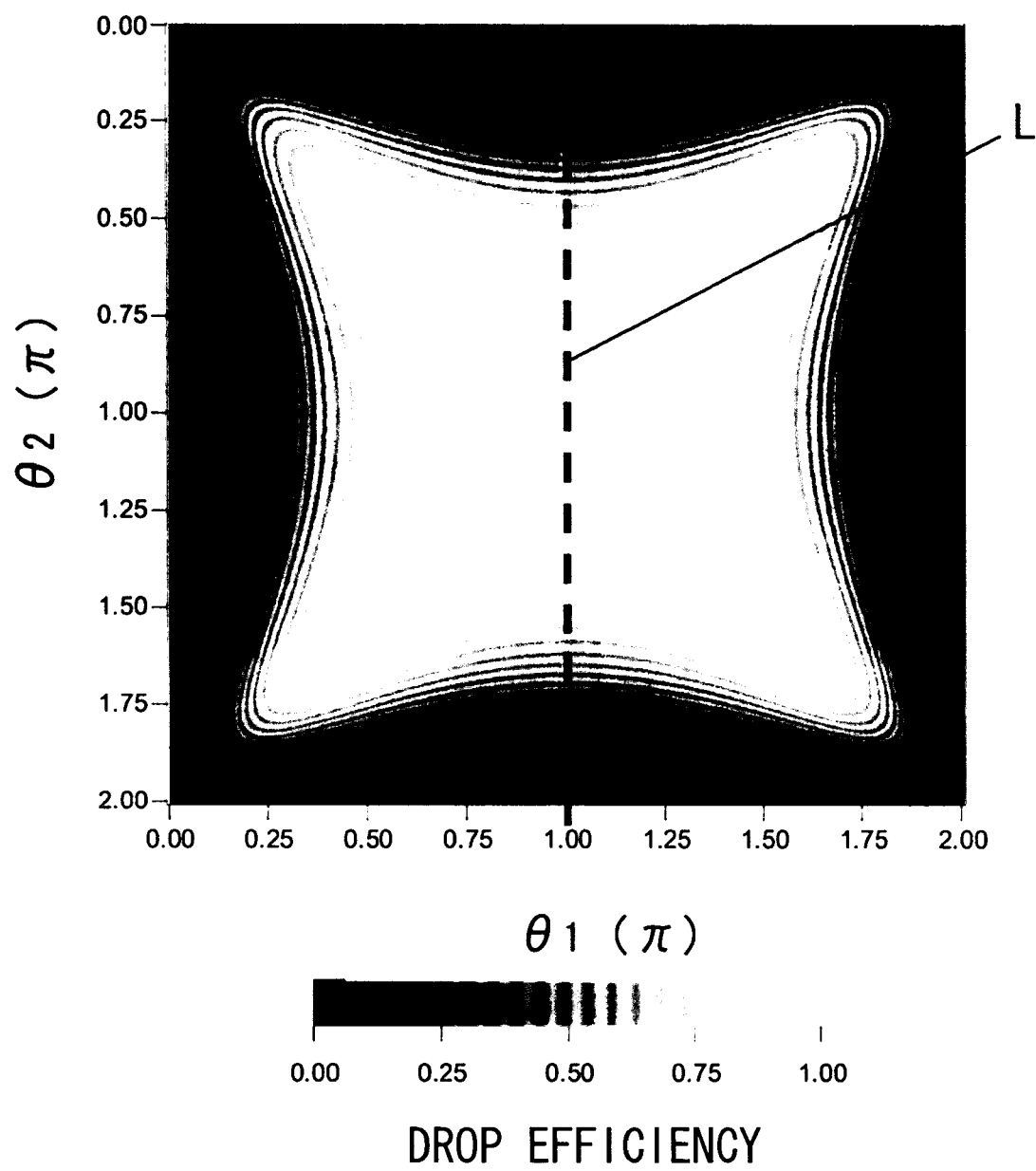
FIG. 11 is a characteristic evaluation view of the sixth embodiment.

As well as FIG. 2 of the first embodiment, FIG. 11 is a view showing the relation between $\theta_1$, $\theta_2$, and the drop efficiency D of the electromagnetic wave frequency filter of this embodiment. For example, in a case of $\theta_1 = \pi$, when $\theta_2$ is changed by varying the refractive index near the output-waveguide-side reflector $31_1$, the drop efficiency D changes along a dashed line L of FIG. 11. So, it is possible to change the drop efficiency D continuously. That is, in the case where the filter is designed to meet $\theta_1 = \pi$, when the refractive index near the output-waveguide-side reflector $31_1$ is changed to meet $\theta_2 = 1.95\pi$, the drop efficiency D becomes almost 0%, and when the refractive index near the output-waveguide-side reflector $31_1$ is changed to meet $\theta_2 = \pi$, the drop efficiency D becomes almost 100%. Therefore, the electromagnetic wave frequency filter of this embodiment can be used as a frequency selective (wavelength selective) electromagnetic wave switch (optical switch).

Although the control means in the electromagnetic wave frequency filter of this embodiment varies the refractive index near the output-waveguide-side reflectors $31_1$, $31_2$, . . . , the control means may vary the refractive index near at least one of the input-waveguide-side reflector and the output-waveguide-side reflector to change the outputs of the drop ports $P3_1$, $P3_2$, . . . . Or, the control means may change the period of the refractive-index periodic structure near at least one of the input-waveguide-side reflector and the output-waveguide-side reflector by using, for example, a substrate comprising a piezoelectric element or piezoelectric material. Of course, the control means may be provided in each electromagnetic wave frequency filter of the above embodiments 1-5.

Seventh Embodiment

When the electromagnetic wave frequency filter of the sixth embodiment is used as the electromagnetic wave switch (the optical switch), it is necessary to switch, for example, between the condition where $\theta_2=\pi$ and the condition where $\theta_2=1.95\pi$ by the control means. So, the control means uses a comparatively large amount of energy, and switching speed as the electromagnetic wave switch becomes comparatively slow.

Figure 12:
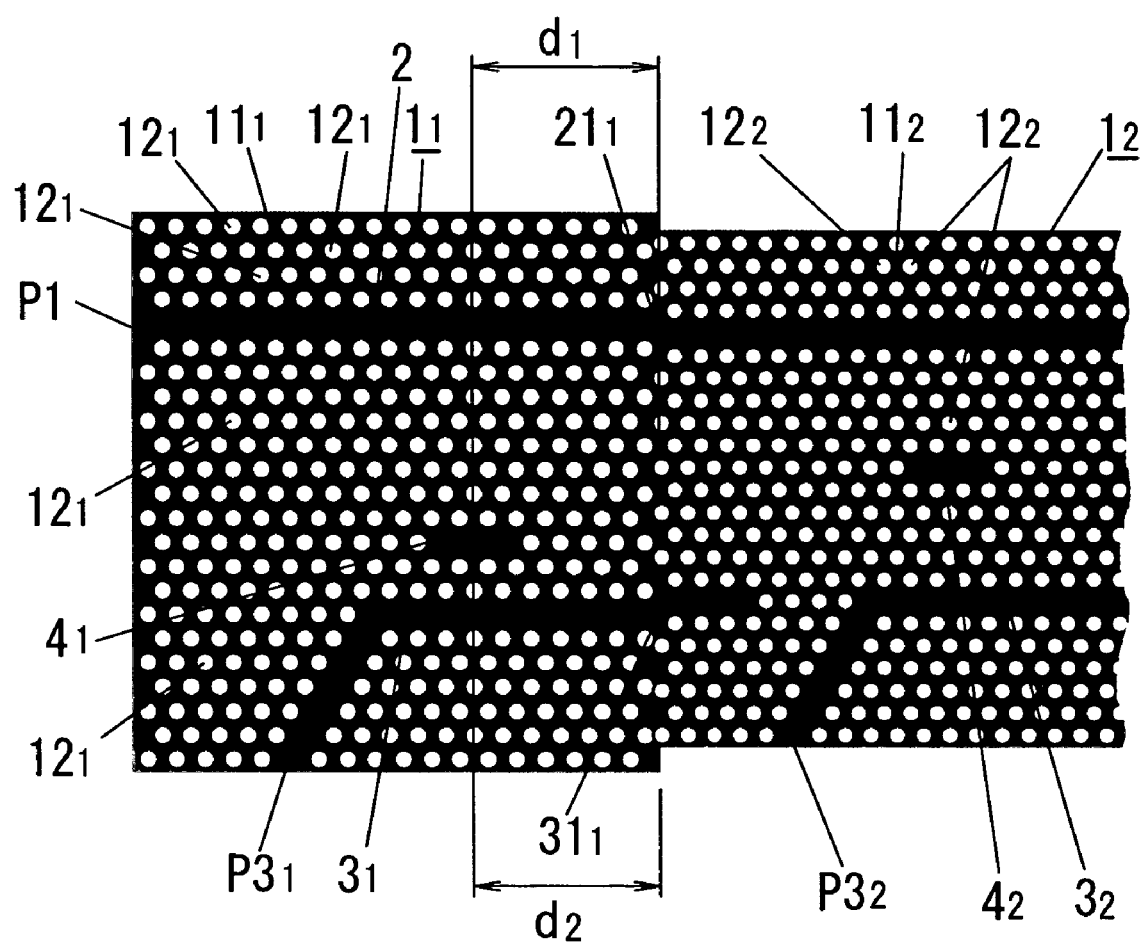
FIG. 12 is a schematic plan view showing a seventh embodiment of the present invention.

The electromagnetic wave frequency filter of this embodiment has the same basic configuration as the sixth embodiment, and it has the control means (not shown) for changing the outputs of the drop ports $P3_1$, $P3_2$, ... by varying the refractive index near the output-waveguide-side reflectors $31_1$, $31_2$, .... But in the electromagnetic wave frequency filter of this embodiment, as shown in FIG. 12, the clearance between the resonator $4_1$ and the input waveguide 2 is set larger than the clearance between the resonator $4_1$ and the output waveguide $3_1$ so as to make the Q-factor $Q_{inb}$ different from the Q-factor $Q_{inr}$. The parts similar to the sixth embodiment are identified by the same reference character and no duplicate explanation is made here.

Figure 13:
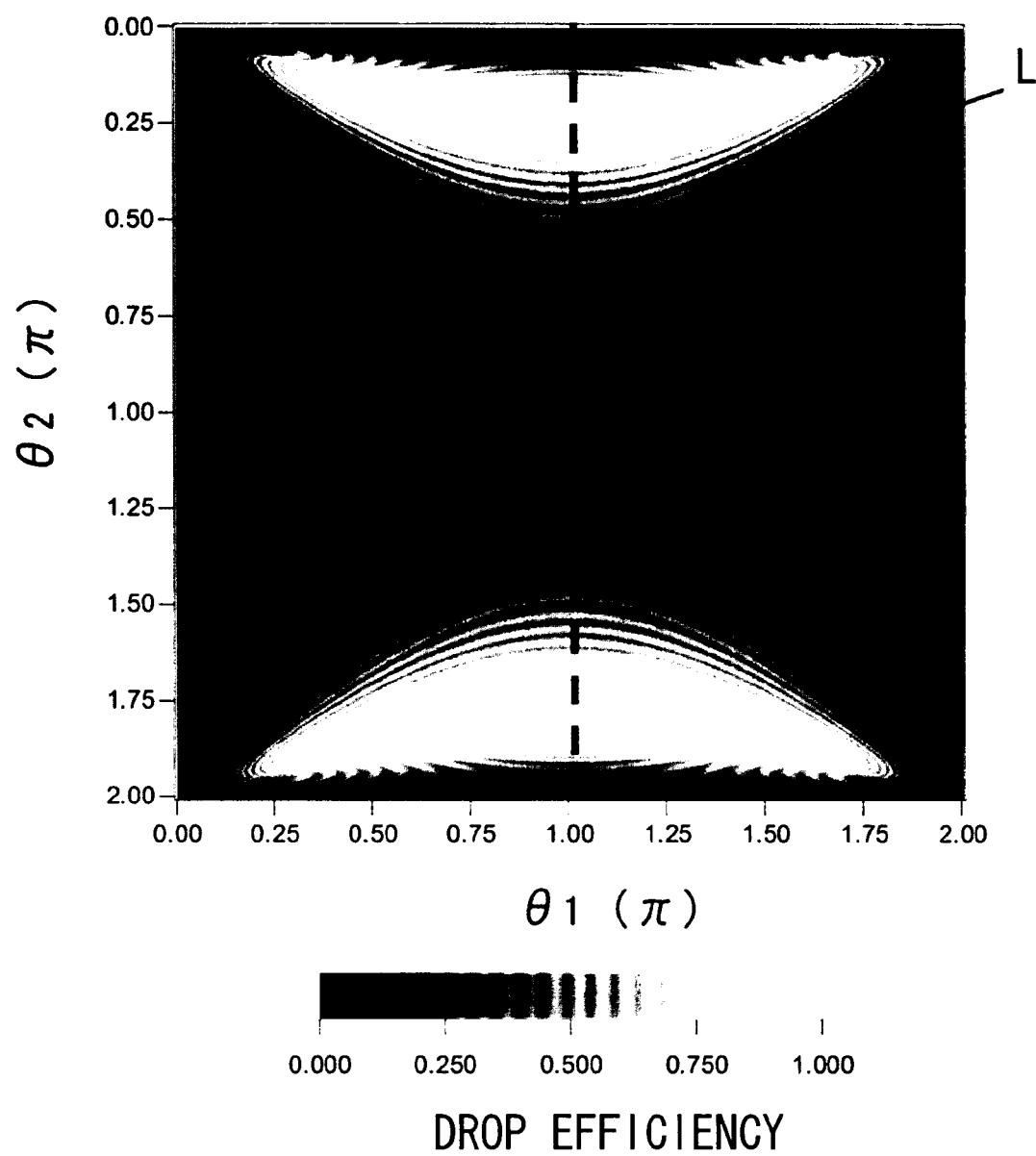
FIG. 13 is a characteristic evaluation view of the seventh embodiment.
Figure 14A:
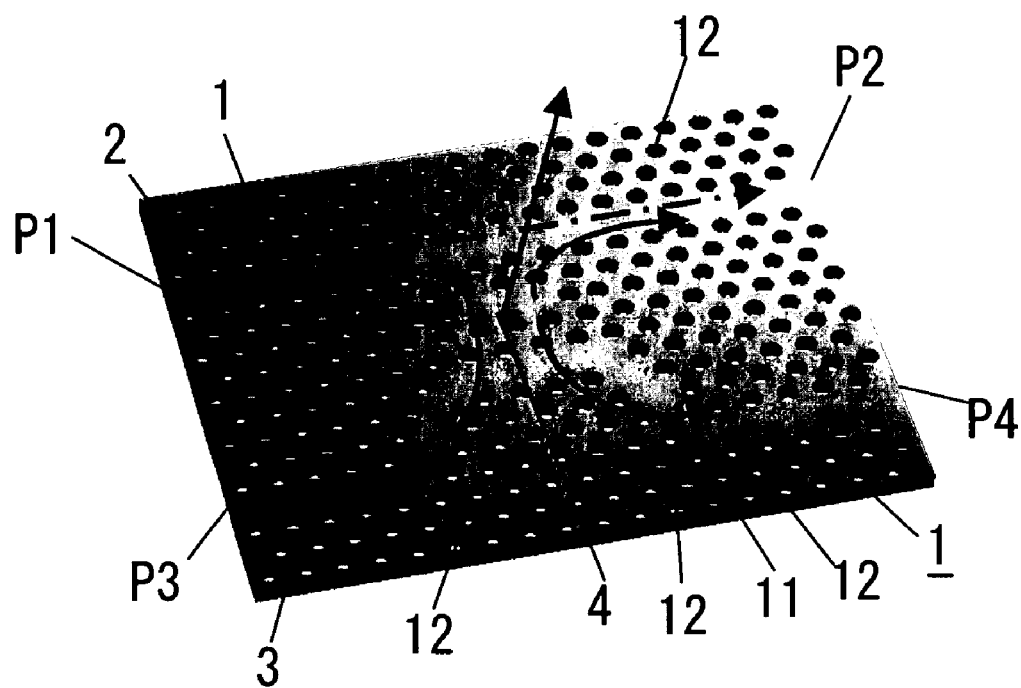
FIG. 14A is a schematic plan view showing a conventional configuration.
Figure 14B:
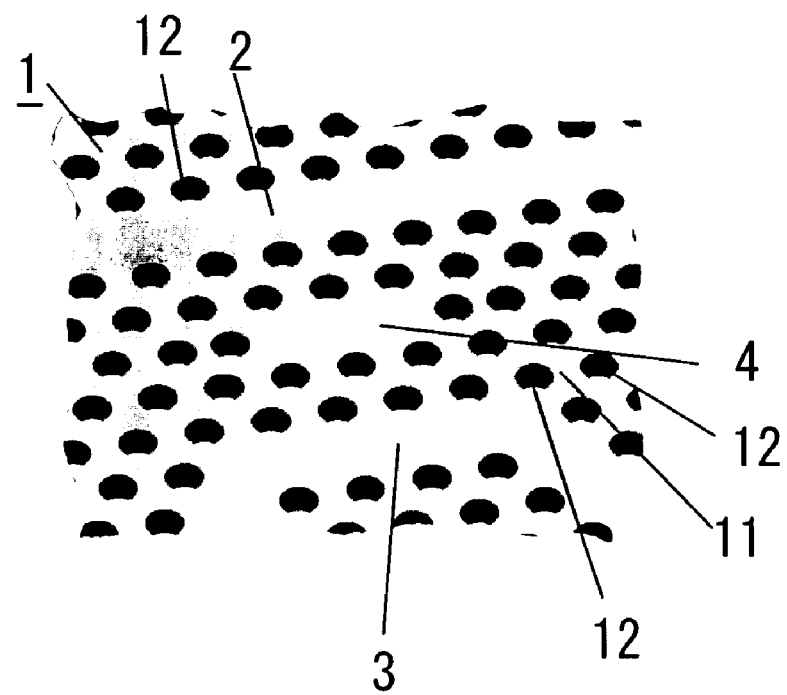
FIG. 14B is an enlarged view showing a substantial part of FIG. 14A.
Figure 15:
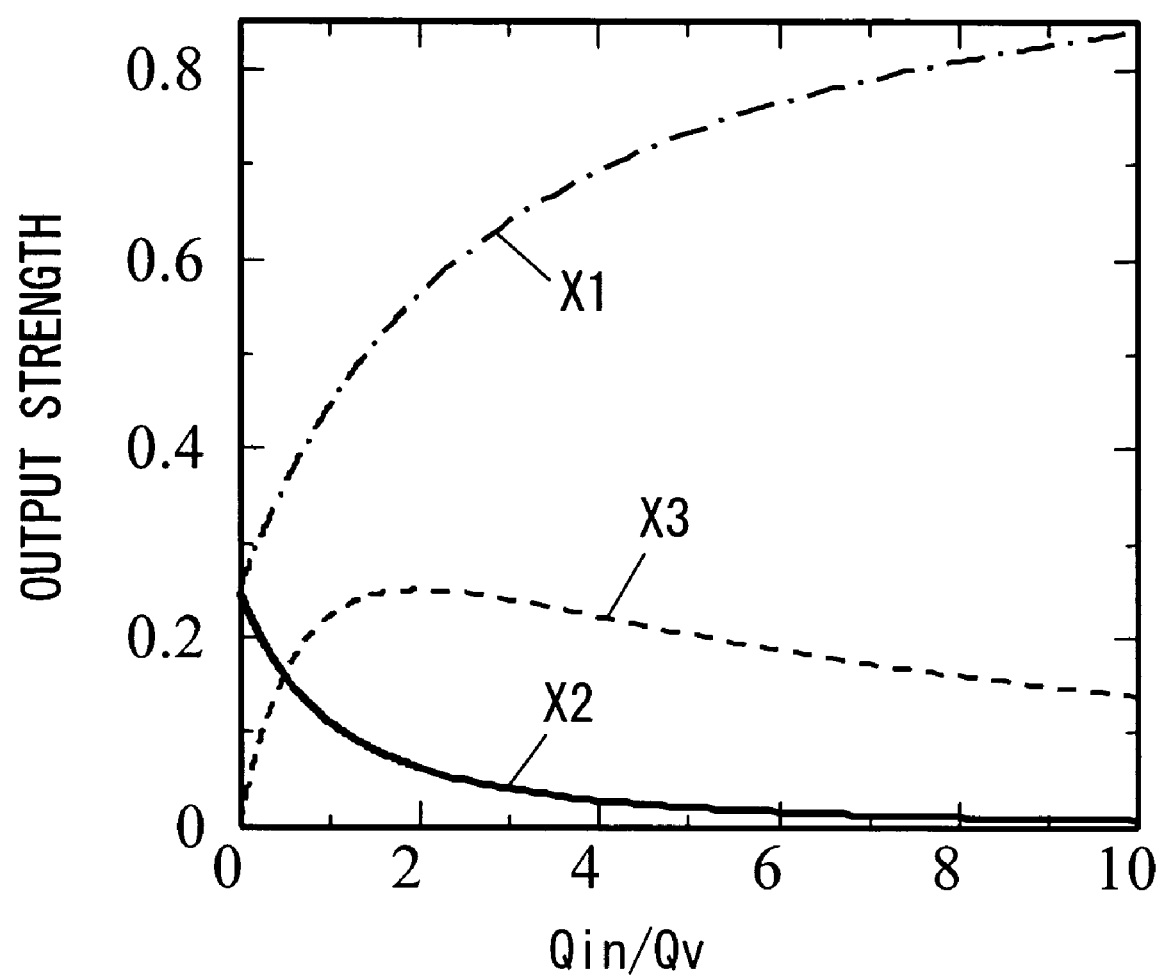
FIG. 15 is a characteristic evaluation view of FIG. 14A.

As well as FIG. 11 of the sixth embodiment, FIG. 13 is a view showing the relation between $\theta_1$, $\theta_2$, and the drop efficiency D of the electromagnetic wave frequency filter of this embodiment. For example, in a case of $\theta_1=\pi$, when the $\theta_2$ is changed by varying the refractive index near the output-waveguide-side reflector $31_1$, the drop efficiency D changes along a dashed line L of FIG. 13. As compared with the sixth embodiment, the amount of change of the drop efficiency D in response to the change of the phase shift amount $\theta_2$ increases. So, in the case where the filter is designed to meet $\theta_1=\pi$, when the refractive index near the output-waveguide-side reflector $31_1$ is changed to meet $\theta_2=1.95\pi$, the drop efficiency D becomes almost 0%, and when the refractive index near the output-waveguide-side reflector $31_1$ is changed to meet $\theta_2=1.8\pi$, the drop efficiency D becomes almost 100%. Therefore, when the electromagnetic wave frequency filter of this embodiment is used as the frequency selective electromagnetic wave switch (optical switch), it is possible to reduce the amount of energy consumption of the control means and to make the switching speed as the electromagnetic wave switch (optical switch) faster, as compared with the electromagnetic wave switch of the sixth embodiment. of the sixth embodiment.

Of course, the control means of this embodiment may be provided in the electromagnetic wave frequency filter of each above embodiment 1-5. Or, in order to use the electromagnetic wave frequency filter as the electromagnetic wave switch, a control means for changing the outputs of the drop ports $P3_1$, $P3_2$, ... by varying the refractive index near the input-waveguide-side reflectors $21_1$, ..., the output-waveguide-side reflectors $31_1$, ..., and the resonators $4_1$, ... each may be used.

Although the two-dimensional photonic crystals $1_1$, $1_2$, ... in each of the above embodiments were constituted by the periodic structure of two kinds of mediums of silicon and air, the two-dimensional photonic crystals may be constituted by the silicon and a dielectric material having refractive index different from the silicon and charged into the round holes $12_1$, $12_2$, .... Alternatively, the two-dimensional photonic crystals may be constituted by periodic structure of three or more kinds of mediums. For example, round holes $12_1$, $12_2$, ... are formed in the slabs $11_1$, $11_2$, ... made of silicon, and insulating films made of $SiO_2$ or $Si_3N_4$ are formed on the inner surface of the round holes to coat them, whereby the two-dimensional photonic crystals constituted by three kinds of mediums of silicon, the insulating film, and air is formed. Further, the in-plane heterostructure explained in each above embodiment may be constituted by the photonic crystals, and as a substitute for each two-dimensional photonic crystal $1_1$, $1_2$, ..., a three-dimensional photonic crystal may be adopted. Although each resonator $4_1$, $4_2$, ... existed between the input waveguide 2 and each output waveguide $3_1$, $3_2$, ... one-by-one in the above embodiments, two or more resonators may exist between the input waveguide 2 and each output waveguide $3_1$, $3_2$, .... In other words, a cluster of resonators may exist between the input waveguide 2 and each output waveguide 31, 32, ....

The invention claimed is:

1. An electromagnetic wave frequency filter comprising:
an input waveguide configured to receive electromagnetic waves of a plurality of frequencies inputted into a one end of said input waveguide;
an output waveguide disposed alongside said input waveguide; and
a resonator disposed between said input waveguide and said output waveguide, said resonator having a resonant frequency and resonating with an electromagnetic wave of a predetermined frequency matching the resonant frequency so as to transmit said electromagnetic wave from said input waveguide to said output waveguide, thereby allowing said electromagnetic wave to be emitted from a drop port of a one end of said output waveguide,
wherein
said input waveguide has an input-waveguide-side reflector for reflecting said electromagnetic wave of the resonant frequency on the opposite side of said one end of the input waveguide from the resonator,
said output waveguide having an output-waveguide-side reflector for reflecting the electromagnetic wave of the predetermined frequency on the opposite side of said one end of the output waveguide,
said electromagnetic wave frequency filter satisfying the following relation:

$Q_{inb}/(1 \cos \theta_1) << Q_v$, $Q_{inb}/(1 \cos \theta_1) = Q_{inr}/(1 \cos \theta_2)$, $\theta_1, \theta_2 \neq 2N\pi (N=0, 1, ...)$, where $\theta_1$ is a phase shift amount of the electromagnetic wave reflected by said input-waveguide-side reflector and returned to near said resonator, $\theta_2$ is a phase shift amount of the electromagnetic wave reflected by said output-waveguide-side reflector and returned to near said resonator, $Q_{inb}$ is a Q-factor between said resonator and said input waveguide, $Q_{inr}$ is a Q-factor between said resonator and said output waveguide, and $Q_v$ is a Q-factor between said resonator and free space.

2. The electromagnetic wave frequency filter as set forth in claim 1, wherein said electromagnetic wave frequency filter has an in-plane heterostructure in which at least a first photonic crystal having a refractive-index periodic structure in a two-dimensional plane and a second photonic crystal having a refractive-index periodic structure whose period is different from that of the refractive-index periodic structure of the first photonic crystal are placed side by side in the same plane,
said input waveguide being formed by creating a linear defect in the refractive-index periodic structures of the first and second photonic crystals along the entire length thereof in an arranging direction of these photonic crystals,
said output waveguide being formed by creating a linear defect in the refractive-index periodic structures of the first and second photonic crystals astride these photonic crystals in the arranging direction of these photonic crystals, said resonator being formed by creating a pot-like defect in the first photonic crystal, said resonant frequency of the resonator being included in a frequency band having no waveguide mode in the second photonic crystal, said input-waveguide-side reflector being formed by a boundary between a portion of the input waveguide formed in the first photonic crystal and a portion of the input waveguide formed in the second photonic crystal, and said output-waveguide-side reflector being formed by a boundary between a portion of the output waveguide formed in the first photonic crystal and a portion of the output waveguide formed in the second photonic crystal.

3. The electromagnetic wave frequency filter as set forth in claim 2, wherein said first photonic crystal and said second photonic crystal each are a two-dimensional photonic crystal, a clearance between said resonator and said input waveguide and a clearance between said resonator and said output waveguide being set equal to each other, a distanced between said resonator and said input-waveguide-side reflector in a direction along said input waveguide and a distance $d_2$ between said resonator and said output-waveguide-side reflector in a direction along the output waveguide being set equal to each other, a propagation constant of the input waveguide $\beta_1$ and a propagation constant of the output waveguide $\beta_2$ being set equal to each other, an amount of axis misalignment between the portion of the input waveguide formed in the first two-dimensional photonic crystal and the portion of the input waveguide formed in the second two-dimensional photonic crystal and an amount of axis misalignment between the portion of the output waveguide formed in the first two-dimensional photonic crystal and the portion of the output waveguide formed in the second two-dimensional photonic crystal being set equal to each other so as to make a reflection phase shift $\Delta_1$ of the electromagnetic wave reflected by said input-waveguide-side reflector and a reflection phase shift $\Delta_2$ of the electromagnetic wave reflected by said output-waveguide-side reflector equal to each other.

4. The electromagnetic wave frequency filter as set forth in claim 3, wherein a period of the refractive-index periodic structure of at least one of said first two-dimensional photonic crystal and said second two-dimensional photonic crystal near a boundary between the first photonic crystal and the second photonic crystal is changed in stages so that the input waveguide extends smoothly and continuously near the boundary.

5. The electromagnetic wave frequency filter as set forth in claim 3, wherein relative positions of said first photonic crystal and said second photonic crystal in an arranging direction of said input waveguide and said output waveguide are set so that the axis misalignment of said input waveguide is not generated between said first photonic crystal and said second photonic crystal, the distance between the resonator and the input-waveguide-side reflector being set so that a relation cos $\theta_1$=cos $\theta_2$ is satisfied.

6. The electromagnetic wave frequency filter as set forth in claim 3, wherein relative positions of said first photonic crystal and said second photonic crystal in an arranging direction of said input waveguide and said output waveguide are set so that the axis misalignment of the input waveguide is not generated between said first photonic crystal and said second photonic crystal, said output-waveguide-side reflector having a phase compensator for matching $\Delta_2$ to $\Delta_1$.

7. The electromagnetic wave frequency filter as set forth in claim 1, wherein said electromagnetic wave frequency filter has an in-plane heterostructure in which at least a first photonic crystal having a refractive-index periodic structure in a two-dimensional plane and a second photonic crystal having a refractive-index periodic structure whose period is different from that of the refractive-index periodic structure of the first photonic crystal are placed side by side in the same plane, said input waveguide being formed by creating a linear defect in the refractive-index periodic structures of the first and second photonic crystals along the entire length thereof in an arranging direction of these photonic crystals, said resonator being formed by creating a pot-like defect in said first photonic crystal, said output waveguide being formed by creating a linear defect in the refractive-index periodic structure of said first photonic crystal, said output-waveguide-side reflector being constituted by an opposite end of said output waveguide.

8. The electromagnetic wave frequency filter as set forth in claim 7, wherein said first photonic crystal and said second photonic crystal each are a two-dimensional photonic crystal, a distance $d_1$ between said resonator and said input-waveguide-side reflector in a direction along said input waveguide and a distance $d_2$ between said resonator and said output-waveguide-side reflector in a direction along said output waveguide being set so that a relation cos $\theta_1$=cos $\theta_2$ is satisfied.

9. The electromagnetic wave frequency filter as set forth in claim 8, wherein the refractive-index periodic structure of said first photonic crystal is varied so that electromagnetic field distribution near the opposite end of said output waveguide does not change abruptly.

10. The electromagnetic wave frequency filter as set forth in claim 1, wherein $Q_{inb}$, $Q_{inr}$, cos $\theta_1$, and cos $\theta_2$ satisfy the following relations:

$Q_{inb}=Q_{inr}$ cos $\theta_1$=cos $\theta_2$.

11. The electromagnetic wave frequency filter as set forth in claim 1, further comprising a control means for changing an output of the drop port by varying a refractive index near at least one of said input-waveguide-side reflector and said output-waveguide-side reflector.

12. The electromagnetic wave frequency filter as set forth in claim 2, further comprising a control means for changing an output of the drop port by varying a period of the refractive-index periodic structure near at least one of said input-waveguide-side reflector and said output-waveguide-side reflector.

13. The electromagnetic wave frequency filter as set forth in claim 1, further comprising a control means for changing an output of the drop port by varying a refractive index near said output-waveguide-side reflector.

14. The electromagnetic wave frequency filter as set forth in claim 1, wherein $Q_{inb}$ and $Q_{inr}$ are different from each other, said electromagnetic wave frequency filter further comprising a control means for changing an output of the drop port by varying a refractive index near said output-waveguide-side reflector.

15. The electromagnetic wave frequency filter as set forth in claim 1, further comprising a control means for changing an output of the drop port by varying a refractive index near said input-waveguide-side reflector, said output-waveguide-side reflector, and said reflector each.

16. The electromagnetic wave frequency filter as set forth in claim 7, further comprising a control means for changing an output of the drop port by varying a period of the refractive-index periodic structure near at least one of said input-waveguide-side reflector and said output-waveguide-side reflector.

* * * * *